United States Patent
Smirnov et al.

(10) Patent No.: US 11,334,961 B2
(45) Date of Patent: May 17, 2022

(54) MULTI-SCALE WARPING CIRCUIT FOR IMAGE FUSION ARCHITECTURE

(71) Applicant: Apple Inc., Cupertino, CA (US)

(72) Inventors: Maxim Smirnov, Portland, OR (US); William T. Warner, Sunnyvale, CA (US); David R. Pope, Fremont, CA (US); Manching Ko, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/987,272

(22) Filed: Aug. 6, 2020

(65) Prior Publication Data

US 2022/0044349 A1    Feb. 10, 2022

(51) Int. Cl.
G06T 1/20 (2006.01)
G06T 3/40 (2006.01)
G06T 3/00 (2006.01)

(52) U.S. Cl.
CPC .............. G06T 1/20 (2013.01); G06T 3/0093 (2013.01); G06T 3/40 (2013.01)

(58) Field of Classification Search
CPC ................................ G06T 3/40; G06T 3/0093
See application file for complete search history.

(56) References Cited

U.S. PATENT DOCUMENTS

| | | | |
|---|---|---|---|
| 6,339,434 B1 | 1/2002 | West et al. | |
| 6,573,889 B1* | 6/2003 | Georgiev | G06T 3/0093 345/419 |
| 7,965,314 B1* | 6/2011 | Miller | H04N 5/2258 348/164 |
| 8,873,883 B2 | 10/2014 | Zhang et al. | |
| 9,202,431 B2 | 12/2015 | Sorkine-Hornung et al. | |
| 9,230,303 B2 | 1/2016 | Kanaev et al. | |
| 2013/0016112 A1* | 1/2013 | Burley | G06T 15/04 345/582 |
| 2018/0315170 A1* | 11/2018 | Mills | G06T 1/60 |
| 2019/0251684 A1* | 8/2019 | Ko | G06T 3/0081 |
| 2020/0020075 A1* | 1/2020 | Khwaja | G06T 5/002 |
| 2021/0065340 A1* | 3/2021 | El-Khamy | H04N 7/0135 |
| 2021/0150666 A1* | 5/2021 | Dolgin | G06T 5/002 |

FOREIGN PATENT DOCUMENTS

WO    WO 2019/216879 A1    11/2019

* cited by examiner

*Primary Examiner* — Phi Hoang
(74) *Attorney, Agent, or Firm* — Fenwick & West LLP

(57) ABSTRACT

Embodiments relate to circuitry for warping image pyramids for image fusion. An image fusion circuit receives captured images, and generates image pyramids corresponding to the received images to be used for image fusion. A warping circuit warps the first image pyramid based upon one or more warping parameters to align the first image pyramid to the second image pyramid. The warping circuit is a multi-scale warping circuit configured to warp each level of the first image pyramid, using a first warping engine that warps a base level of the image pyramid, and at least one addition warping engine that warps a plurality of scaled levels of the image pyramid in parallel with the first warping engine.

20 Claims, 12 Drawing Sheets

MULTI-SCALE WARPING CIRCUIT FOR IMAGE FUSION ARCHITECTURE

BACKGROUND

1. Field of the Disclosure

The present disclosure relates to a circuit for processing images and more specifically to fusion of different images.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

SUMMARY

Embodiments relate to circuitry for warping image pyramids for use in temporal processing and/or image fusion. An image fusion circuit receives captured images, and generates image pyramids corresponding to the received images that are stored in memory. A fusion module receives a first image pyramid and a second image pyramid from the memory for image fusion. To use the image pyramids, a warping circuit warps the second image pyramid based upon one or more warping parameters determined based upon registration of a first image associated with the first image pyramid to a second image associated with the second image pyramid, to generate a warped image pyramid that better aligns with the first image pyramid than to the original second image pyramid. The warping circuit is a multi-scale warping circuit configured to warp each level of the second image pyramid, using a first warping engine that warps a base level of the image pyramid, and at least one additional warping engine that warps a plurality of scaled levels of the image pyramid in parallel with the first warping engine. By utilizing multiple warping engines that warp different levels of the image pyramid in parallel, the warping circuit is able to warp the second image pyramid having multiple levels within the amount of time needed to warp the base level of the image pyramid, improving process speed of the image fusion circuit.

Figure 1:
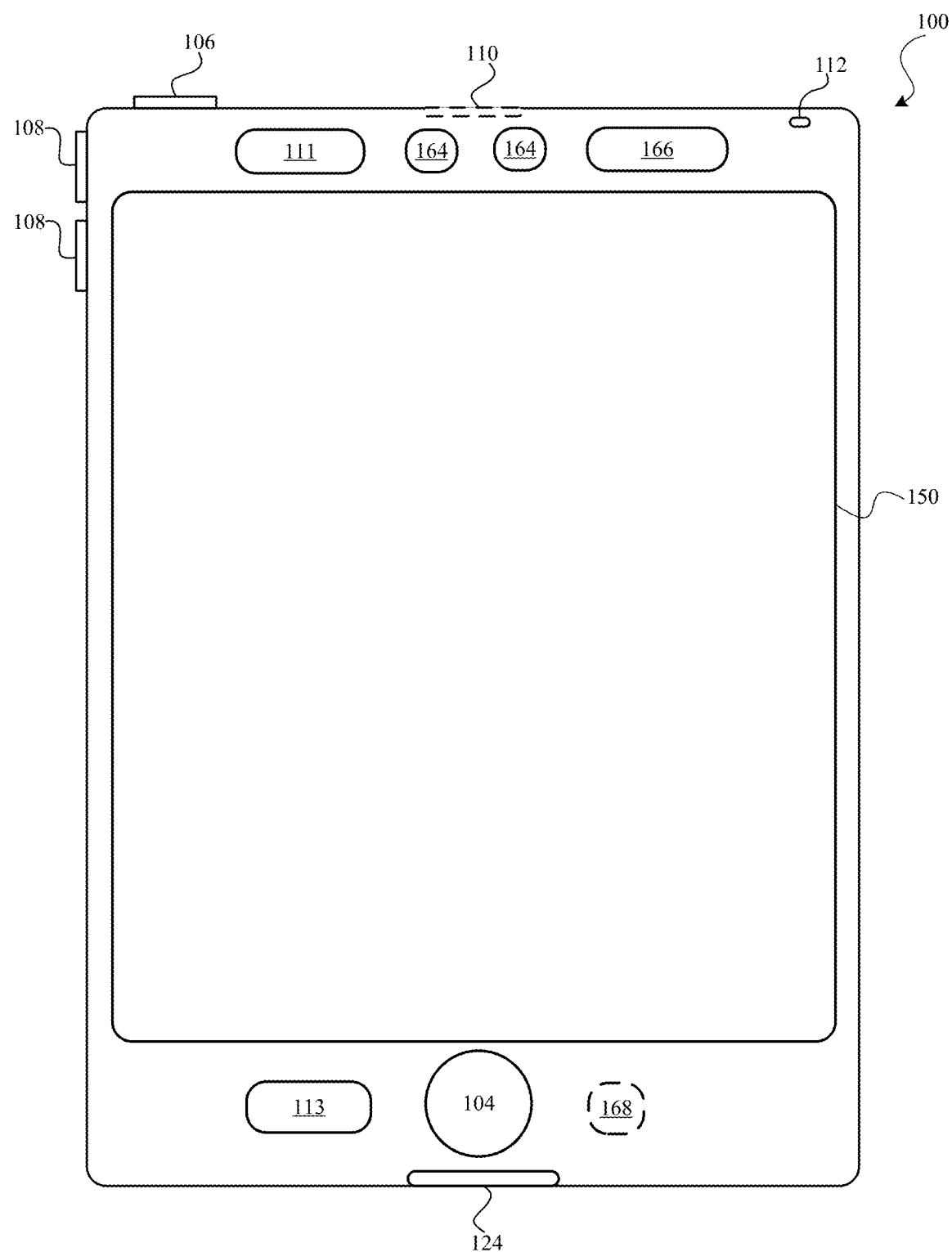
FIG. 1 is a high-level diagram of an electronic device, according to one embodiment

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to circuitry for warping image pyramids for use in temporal processing and/or image fusion. Image fusion can be used for a variety of different applications, such as for generating higher dynamic range images by fusing different images with different exposure times, or for temporal filtering where newly-received images are fused with a history image representing a fusion of one or more previously received images, or some combination thereof. To fuse images, image pyramids are generated from the images, and a warping circuit warps one of the image pyramids based upon one or more warping parameters determined based upon the images to generate a warped image pyramid that aligns closer to the other image pyramid than to the original un-warped image pyramid. The warping circuit is a multi-scale warping circuit that warps each level of the received image pyramid, using a first warping engine that warps a base level of the image pyramid, and at least one addition warping engine that warps a plurality of scaled levels of the image pyramid in parallel with the first warping engine. By utilizing multiple warping engines that warp different levels of the image pyramid in parallel, the warping circuit is able to warp the first image pyramid having multiple levels within the amount of time needed to warp the base level of the image pyramid, improving process speed of the image fusion circuit.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
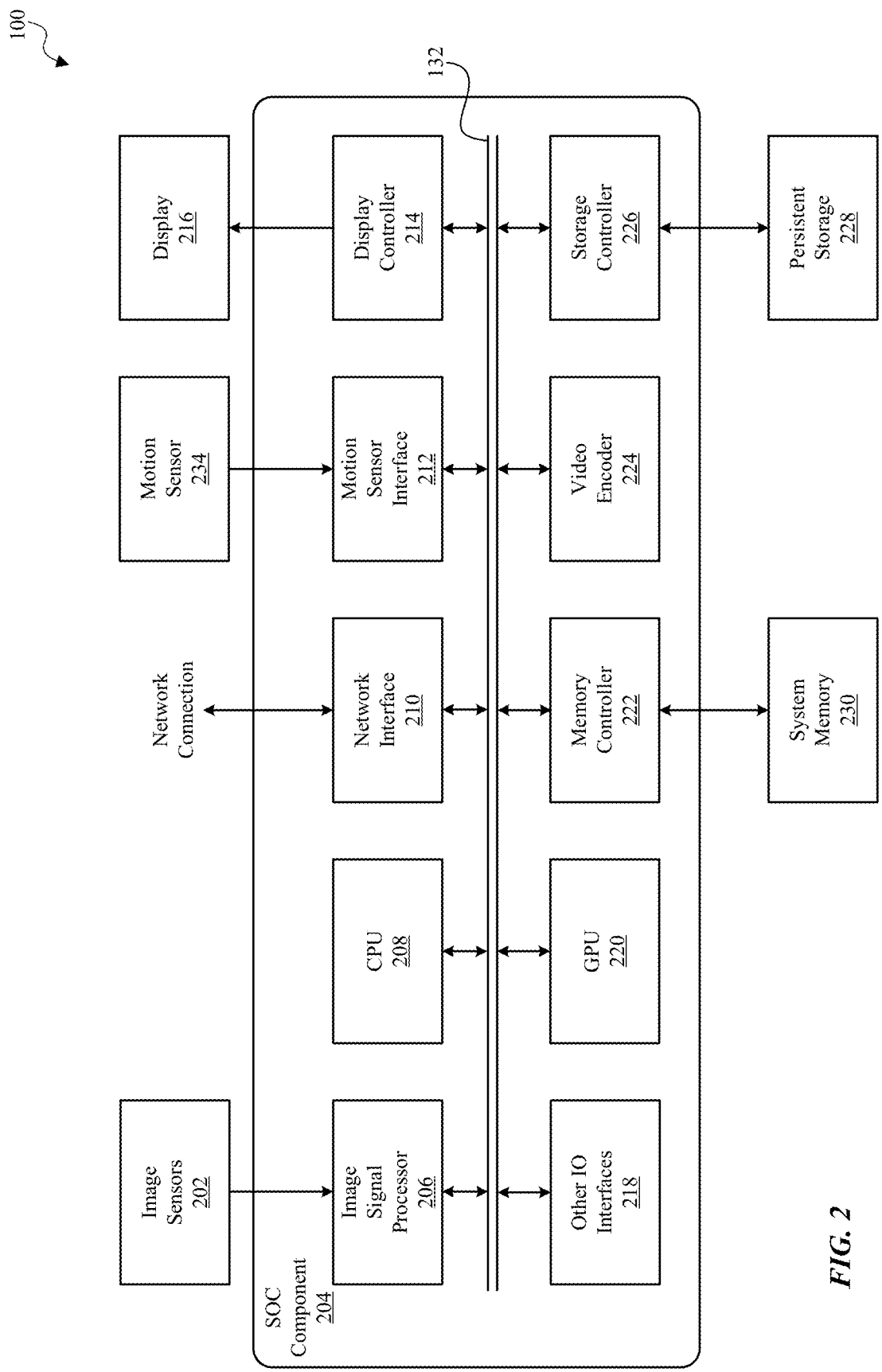
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
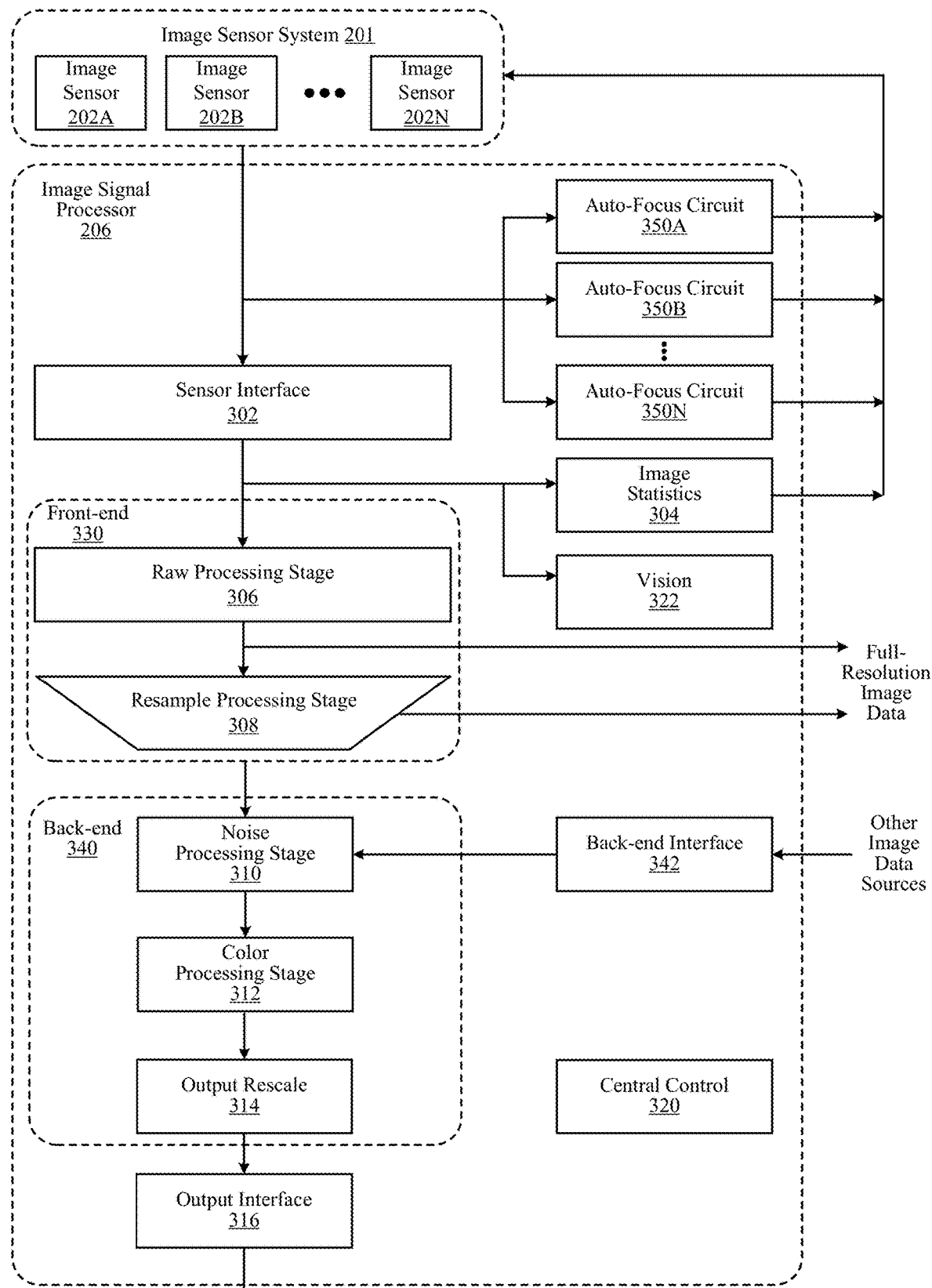
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Pipelines for Image Fusion

Figure 4:
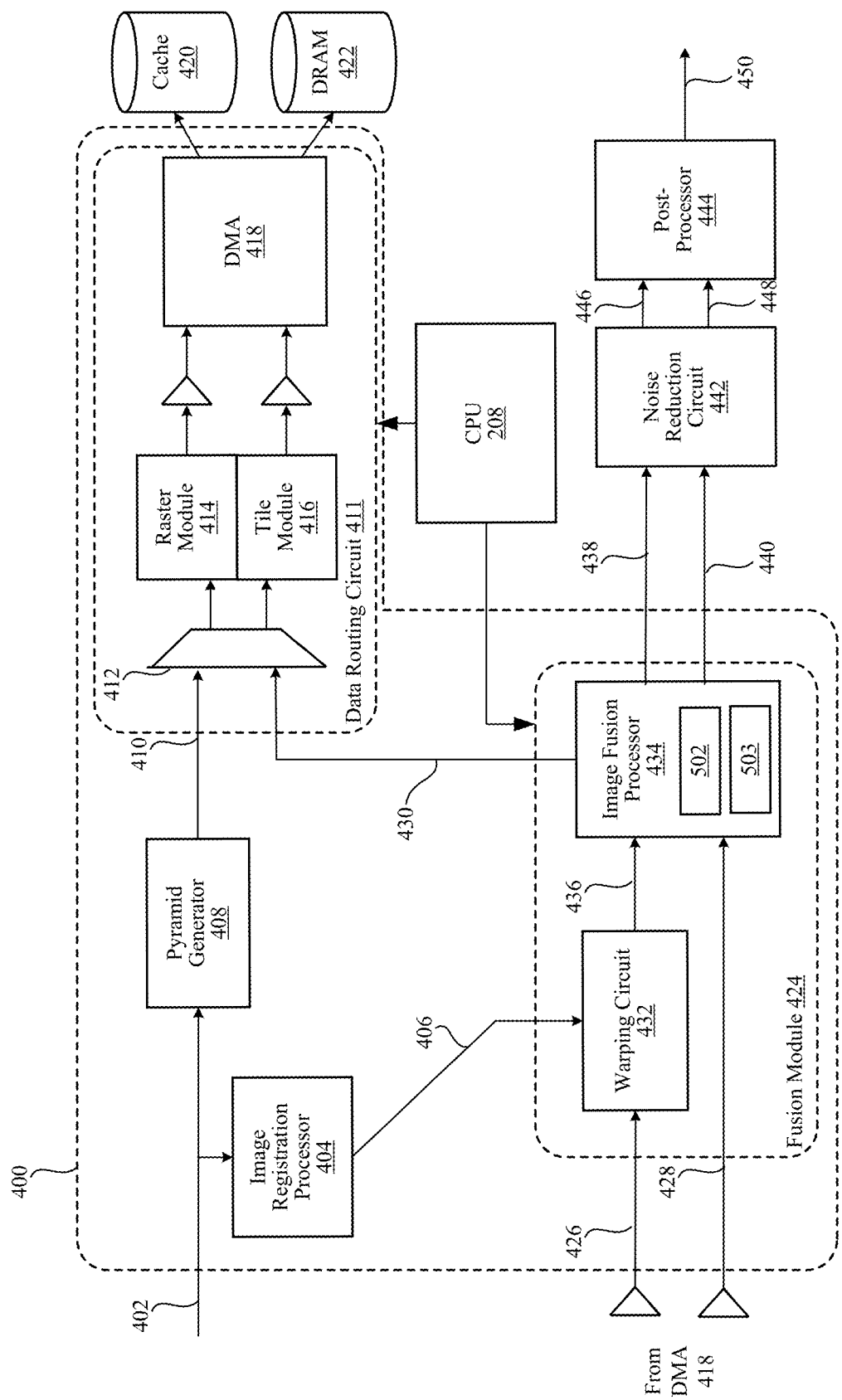
FIG. 4 is a block diagram illustrating a portion of the image processing pipeline including circuitry for image fusion, according to one embodiment.

FIG. 4 is a block diagram illustrating a portion of the image processing pipeline including circuitry for image fusion, according to one embodiment. The image fusion circuit 400 may be implemented as part of the vision module 322, front-end 330, and/or back-end 340 illustrated in FIG. 3. For example, in some embodiments, the vision module 322 is used to perform feature extraction from received images (e.g., based on keypoints of the received images), while pyramid generation may be performed at the front-end 330 (e.g., resample processing stage 308), and image fusion and noise reduction may be performed at the back-end 340 (e.g., noise processing stage 310). The image fusion circuit 400 implements a plurality of different types of fusion schemes, including bypass (e.g., no fusion), two-frame fusion (including but not limited to generation of HDR images), temporal filtering such as infinite impulse response (IIR) or finite impulse response (FIR), and/or the like. The controller 208 is coupled to the image fusion circuit 400 and configures the components of the image fusion circuit 400 to perform different operations based on the desired mode, described in greater detail below. The processing performed by the image fusion circuit 400 on received images may be referred to as "temporal processing." The temporally processed images may then be received by a spatial noise reduction circuit and/or post-processor circuit for performing "spatial processing" of the image. As such, the image fusion circuit 400, in conjunction with the noise reduction circuit 442 and post-processor 444 illustrated in FIG. 4, is used to perform "temporal-then-spatial" processing on received images.

The image fusion circuit 400 receives a plurality of images 402 captured by the image sensor system 201. In some embodiments, the images 402 include a plurality of sequentially captured images, while in other embodiments, the images 402 may correspond to sets of images captured concurrently using different image sensors 202 (e.g., first and second images captured at the same time using different sensors with different exposure times). Each of the images 402 may include multiple color components, e.g., luma and chroma color components.

In some embodiments, the images 402 are received by the image registration processor 404. The image registration processor 404 is hardware or combination of hardware and software that extracts features from an image of the received images 402, and match the extracted features with those of another image (e.g., another image of the received images 402, an image corresponding to a history frame, etc.) in order to determine a set of warping parameters between the different images. The extracted features correspond to distinguishable features within the image (also referred to as "salient points") and may be stored as a set of keypoints for the image. In some embodiments, each keypoint is associated spatial locations (e.g., coordinates) of at least a subset of pixels in the image frame. In addition, the image registration processor 404 may extract and encode keypoint descriptors for the set of extracted keypoints, which may include keypoint scale and orientation information.

In some embodiments, the image registration processor 404 further maps the set of keypoints extracted from the received image to a set of keypoints extracted from another image (e.g., a previously captured image, a concurrently captured image, a history image frame, etc.). Mapping can be performed, for example, by building a model describing correspondence between the keypoints of the different images, and searching for correspondences between the sets of keypoints to generate at least one motion vector representing relative movement between in portions of the images. In one embodiment, the image registration processor 404 correlates (matches) the keypoint information of the images, e.g., by comparing and pairing keypoint descriptors extracted from the images to determine a set of keypoint information matches, such as pairs of keypoint descriptors extracted from the images. The image registration processor 404 may then perform a model fitting algorithm by processing the determined set of keypoint information matches to build the model. The model fitting algorithm may be designed to discard false matches during the model building process. In some embodiments, the model fitting algorithm may be based on, e.g., the iterative random sample consensus (RANSAC) algorithm. The model built by the image registration processor 404 may include information about mapping between pixels in the images. The model may represent a linear transformation (e.g., affine or perspective transformation). Alternatively, the model may describe a non-linear transformation. Based on the model, warping parameters (mapping information) 406 are be generated by the image registration processor 404 and sent to warping circuit 432 for spatial transformation of at least one of the images. In some embodiments, warping parameters 406 can be used in a form of a matrix for spatial transformation (e.g., warping) of at least one of the images. The matrix for spatial transformation represents a geometric transformation matrix or a mesh grid with motion vectors defined for every grid point.

The image registration processor 404, to generate warping parameters between two images, may generate a set of keypoints for only the first image, and generates a motion vector for each of the keypoints of the first image. This is done by performing, e.g., the NCC search within an expected and configurable displacement range to determine a best feature match within a defined spatial vicinity (patch) of each keypoint of the first image. In such case, image registration processor 404 performs a model fitting algorithm (e.g., the RANSAC algorithm) that uses first keypoint information (e.g., coordinates of the keypoints of the first image) and corresponding motion vectors determined based on feature matches to build a model. The model fitting algorithm may be designed to discard false feature matches. Based on the built model, image registration processor 404 generates warping parameters (mapping information) 406 that is sent to warping circuit 432 for spatial transformation of the first image.

The received images 402 are also received by a pyramid generator circuit 408. The pyramid generator circuit 408 generates, for a received image 402, multiple downscaled images (also referred to as levels, scales, or octaves) each having a different resolution by sequentially downscaling the received image. Each downscaled image includes the multiple color components (e.g., Y, Cr, Cb color components). In addition, the pyramid includes an unscaled single color version (e.g., Y luma component only) of the image 402. As such, the generated pyramid 410 may include a plurality of stages 0 through n (e.g., 7 stages, corresponding to stages 0 through 6), where stage 0 corresponds to the unscaled single color image (e.g., Y component only), while stages 1 through n correspond to sequentially downscaled images with multiple color components (e.g., YCrCb), and the value of n (e.g., 6) corresponds to a number of downscaled levels. In some embodiments, each sequential stage of downscaling corresponds to downscaling each of the width and height by a factor of 2 relative to a previous stage. The generated pyramid 410 thus comprises low frequency components of the downscaled warped images and a low frequency component of an unscaled single color version (e.g., luma component) of the received image 402. The image pyramid 410 may be stored in memory, warped based upon a set of warping parameters determined for the corresponding image 402, fused with another image pyramid, etc.

In some embodiments, the generated image pyramid 410 output by the pyramid generator 408 is stored in memory in preparation for warping and/or fusion. For example, in applications where two captured images are to be fused (e.g., concurrently captured long exposure image frame and short exposure image frame, or two sequentially captured images), the pyramid generator 408 may generate a pyramid for the first of the two images, and store the generated image pyramid in memory while an image pyramid for the second image is being generated. In some embodiments, portions of the image pyramid 410 are stored in a cache that functions as a buffer before being transmitted to the fusion module 424, bypassing the memory (e.g., DRAM 422). How the generated pyramid 410 is stored may be determined using a data routing circuit 411 coupled to the pyramid generator 408. The data routing circuit 411 may comprise the multiplexor 412, raster module 414, tile module 416, and DMA 418 illustrated in FIG. 4.

The generated image pyramid 410 can be stored in either raster form, or in tile form. In some embodiments, the image pyramid 410 is received by a multiplexor (MUX) 412 configured to transmit the generated image pyramid 410 to a raster module 414 or to a tile module 416 in preparation for storage, based upon whether the image pyramid 410 is to be warped as part of an image fusion process. For example, if the generated image pyramid 410 is to be warped, the MUX 412 transmits the image pyramid 410 to the tile module 416 to be converted into a tile format for storage. On the other hand, if the generated image pyramid 410 does not need to be warped, the image pyramid 410 is sent through the raster module 414. In some embodiments, the pyramid generator 408 is configured to output the image pyramid 410 already in raster form. As such, the raster module 414 may simply be bypass circuit, allowing the image pyramid 410 to be stored to memory.

In some embodiments, the raster and/or tile modules 414 and 416 output the image pyramid to direct memory access (DMA) 418, which may store the image pyramid 410 (in raster or tile format) within persistent memory (e.g., DRAM 422) or within a cache (e.g., cache 420) that bypasses the memory. In some embodiments, if only a portion of the image pyramid 410 is to be stored (e.g., the image pyramid is to be immediately used for image fusion, such that only a portion of the pyramid needs to be stored at a time), then the DMA 418 may store the image pyramid 410 using cache 420, which acts as a buffer between the pyramid generator 408 and the fusion module 424. On the other hand, if the entire image pyramid is to be stored, and/or stored for a length of time, then the image pyramid 410 is stored in the DRAM 422. In some embodiments, the DRAM 422 is used to a store previously processed image pyramid (e.g., a history image pyramid) to be fused with image pyramids (e.g., image pyramid 410) created from received images 402.

The fusion module 424 is configured to receive, from the DMA 418, a first image pyramid 428 and a second image pyramid 426, and fuse the first and second image pyramids to generate a fused image pyramid 430. In some embodiments, the first and second images pyramids 428 and 426 correspond to image pyramids 410 generated by the pyramid generator 408, using respectively, first and second images of the received images 402 captured by the image sensor system 201. In some embodiments, at least one of the first and second image pyramids 428 and 426 corresponds to a previously fused image pyramid (e.g., a previous fused pyramid 430). How the first and second image pyramids 428 and 426 are received by the fusion module 424 may depend upon a current image fusion scheme (e.g., streaming, two-frame fusion, IIR, FIR, etc.) implemented by the fusion module 424 (e.g., as instructed by the controller 208). In some embodiments, the fusion module 424 may be able to receive a generated pyramid 410 directly from the pyramid generator 408 (e.g., without going through the DMA 418).

The fusion module 424 comprises a warping circuit 432 and an image fusion processor 434. The warping circuit is configured to warp the second image pyramid 426 based upon one or more warping parameters 406 (determined by the image registration processor 404) to align the images of the second image pyramid 426 with those of the first image pyramid 428 (which may be referred to as a primary or reference image pyramid). The warping circuit 432 performs a linear or non-linear transformation defined by the model generated by the image registration processor 404. Warping circuit 432 warps the second image pyramid 426 using the mapping information according to the warping parameters 406 to generate a warped version of the second image pyramid 426 (warped image pyramid 436) spatially better aligned to the image of the first image pyramid 428 (e.g., a primary image or reference image) than to the image of the second image pyramid 426. In some embodiments, the warping circuit 432 is a multi-scale warping circuit configured to warp each stage of the second image pyramid 426 to produce the warped image pyramid 430, comprising an unscaled warped single-color image and plurality of downscaled warped multi-color images.

The warped image pyramid 436 generated by warping circuit 432 is then passed onto image fusion processor 434. Image fusion processor 434 performs per pixel blending between a portion of the images of the warped image pyramid 436 generated from the second image pyramid 426 with a portion of the images of the first image pyramid 428 to generate the fused image pyramid 430. The fused pyramid includes an unscaled single color image and one or more downscaled images having multiple color components, each downscaled image corresponding to a downscaled version of a previous stage of the fused image pyramid 430. The fused image pyramid 430 (also referred to as a reconstructed pyramid) may be received by the DMA 418 (e.g., via the MUX 412) to be stored in memory (e.g., DRAM 422) for use in subsequent image fusion operations, based upon a current image fusion scheme implemented by the image fusion circuit 400. In addition, at least a portion of the fused image pyramid 430 is passed onto the noise reduction circuit 442 and the post-processor 444 for further processing and enhancement (e.g., spatial processing). For example, in some embodiments, the unscaled single color version 438 and a first downscaled stage 440 of the fused image pyramid 430 are passed to the noise reduction circuit 442 and the post-processor 444. The first downscaled version 440 corresponds to a first downscaled level of the fused image pyramid 436, and has a pixel resolution equal to a quarter of a pixel resolution of unscaled single color version 438. The image fusion processing circuit 434 includes multi-scale image fusion circuit 502 to produce the downscaled images of the fused image pyramid 430 (including first downscaled version 440), shown in FIG. 5A, and image fusion circuit 503 to produce the unscaled single color version 438 of the fused image pyramid 430, shown in FIG. 5B. More details about structure and operation of image fusion processing circuit 434 are provided below in detail in conjunction with FIGS. 5A-5B and FIGS. 6A-6B.

Noise reduction circuit 442 is configured to perform receive at least a portion of the fused image pyramid (e.g., unscaled single-color version 438 and first downscaled version 440) and perform noise reduction (e.g., multi-band noise reduction (MBNR)) to obtain a processed image pyramid (e.g., having processed unscaled single-color version 446 and processed first downscaled version 448). In some embodiments, the noise reduction circuit 442 further receives confidence values associated with each pixel of the unscaled single-color version 438 and first downscaled version 440, wherein an amount of noise reduction performed may be based upon the confidence values of the received images (e.g., a higher confidence value may indicate that less noise reduction is necessary). In some embodiments, the noise reduction circuit 442 may perform noise reduction on the images of the fused image pyramid based upon confidence values associated with each pixel of the images. In some embodiments, each pixel is associated with a confidence value specified using a predetermined number of bits (e.g., 4 bits). An invalid pixel (such as an overexposed pixel) may be marked with a confidence of 0. In some embodiments, the pyramid generator 408 may mark overexposed pixels of received images as having a confidence value of 0, and propagate the confidence value to all stages of the generated pyramid (e.g., using erosion morphological operation, described in greater detail in association with FIG. 6A below).

Post-processor 444 is part of color processing stage 312 and performs post-processing of the processed unscaled single color version 446 and the processed first downscaled version 448 of the processed image pyramid received from the noise reduction circuit 442 to obtain post-processed fused image 450. In some embodiments, post-processing circuit 450 includes a plurality of components (not shown) such as a sub-band splitter (SBS) circuit, a local tone mapping (LTM) circuit, a local contrast enhancement (LCE) circuit, a sub-band merger (SBM) circuit and a sharpening circuit. The SBS circuit performs sub-band splitting of processed unscaled single color version 446 to generate a high frequency component of the unscaled single color version passed onto the SBM circuit. The SBS circuit also performs sub-band splitting of processed first downscaled version 448 to generate a low frequency component of first downscaled version passed onto The LTM circuit. The LTM circuit performs LTM operation on the received low frequency component of the first downscaled version to generate a processed version of low frequency component of the first downscaled version passed onto the LCE circuit. The LCE circuit performs local photometric contrast enhancement of a single color component (e.g., luma component) of the processed version of the low frequency component of the first downscaled version to generate an enhanced version of first downscaled version of the fused image. The SBM circuit merges the high frequency component of the unscaled single color version (received from the SBS) and the enhanced version of the first downscaled version of the fused image (received from the LCE) to generate merged fused image data that is passed onto the sharpening circuit, which performs sharpening (e.g., photometric contrast enhancement) on a single color component (e.g., luma component) of the merged fused image data to generate post-processed fused image 472. Post-processed fused image 472 can be passed to output rescale 314 and then output interface 316 (illustrated in FIG. 3). The processing performed at post-processor 444 is merely an example, and various other post-processing may be performed as an alternative or as an addition to the processing at post-processor 444.

As illustrated in FIG. 4, the image pyramids 410 generated by the pyramid generator 408 (using received images 402) and the reconstructed pyramid 430 generated by the image fusion module 424 (by fusing received image pyramids) can each be received by the DMA 418 for storage in memory. In addition, image pyramids stored in memory (through the DMA 418) may be received as first/second image pyramids 428/426 for fusion by the fusion module 424. As such, various schemes involving fusion of different combinations of generated image pyramids and reconstructed image pyramids can be implemented, based upon a current application of the image fusion circuit 400. For example, for generating HDR images, long exposure images and short exposure images may be received as images 402 and used to create generated pyramids 410. Pairs of generated pyramids (e.g., comprising pyramids of corresponding long exposure and short exposure images) may be stored in memory (e.g., cache 420 and DRAM 422) and received by the fusion module 424 to be fused into an HDR image. On the other hand, for performing temporal filtering, reconstructed pyramids 436 generated by the fusion module 424 may be stored in memory as a history pyramid, to be fused with generated pyramids 410 corresponding to newly received images 402. The controller 208 may configure the operations of the image fusion circuit 400 in accordance with one or more predefined modes. For example, based upon a predefined configuration mode, the controller 208 may control operations of the data routing circuit 411 (e.g., including MUX 412 and DMA 418) to configure whether image pyramids 410 generated from received images 402 are raster or tile processed, and whether they are stored in the cache 420 or DRAM 422. The controller 208 further configures how the fusion module 424 receives first and second image pyramids 426, 428, and whether the resulting fused pyramid 430 stored back into memory (e.g., via the data routing circuit 411). In some embodiments, the controller 208 transmits a configuration mode parameter to components of the image fusion circuit 400 (e.g., the data routing circuit 411 and the fusion module 424) to configure the operations of the components in order to configure the components to allow the image fusion circuit 400 to operate in accordance with a selected configuration mode. For example, the controller 208 may transmit different configuration mode parameters to cause the image fusion circuit 400 to switch between different configuration modes.

Example Pixel Confidence Values

In some embodiments, each pixel of a received image frame is associated with a respective confidence value. In some embodiments, the confidence value indicates a level of pixel reliability. For example, a higher confidence value indicates a lower noise band standard deviation expected for the pixel, while a confidence value of 0 indicates an invalid pixel (i.e., standard deviation is infinite). In some embodiments, the standard deviation is calculated based upon a noise model (e.g., as a function of a pixel value from a look-up table (LUT), which may be pre-calculated using a photon shot noise and read noise approach). In some embodiments, the confidence value for a pixel of a single un-fused image frame may be either 0 or 1.

As images are fused together, the confidence value associated with a pixel may increase. In some embodiments, the confidence value is represented as a sequence of bits (e.g., 4 bits, thus having 16 possible values, from 0 to 15). For example, a pixel of a first image associated with a confidence value of 1 fused with a pixel of a second image associated with a confidence value of 1 may result in a fused pixel having a confidence value of 2. As such, in embodiments where confidence is expressed using four bits, the confidence value of a pixel of a fused image may indicate a number of valid image pixels used to produce the fused pixel of the image (up to a maximum value, e.g., 15). In some embodiments, the confidence value of a pixel of a fused image may be reduced due to ghost detection, so the confidence value for the pixel may be less than the number of valid image pixels used to produce the fused pixel of the image. As additional images are used, noise is reduced, resulting in lower standard deviation and higher confidence values.

In some embodiments, the confidence values of the pixels are used to determine how the image fusion circuit (e.g., the image fusion processor 434 illustrated in FIG. 4) fuses images. The image fusion circuit uses the confidence values to assign a weight to each pixel when performing image fusion. For example, when fusing a first pixel from an image corresponding to several other images fused together, and a second pixel from an image that has not been fused with any other images, the first pixel may be assigned a greater weight relative to the second pixel, as it already reflects the pixel data of multiple other images. The confidence value of the pixels may also be used to determine an amount of noise reduction to be performed on the pixels of the image (e.g., by the noise reduction circuit 442 illustrated in FIG. 4). For example, a higher confidence value indicates a lower standard deviation, and as such less noise reduction is needed to be applied to the pixels of the image.

In some embodiments, the confidence value for each pixel may be stored along with the value of the pixel. For example, in some embodiments, each pixel is represented using the YCbCr color space. Pixels of each component of the images may be stored using 16 bits for the component value (e.g., no dynamic range companding) and 4 bits for confidence value (20 bits total), or 12 bits (e.g., with companding) for component value and 4 bits for confidence value (16 bits total) per color component of the image. In some embodiments, each pixel may correspond to a single confidence value, instead of a confidence value for each component of the pixel.

Example Architecture for Image Fusion Processing

As illustrated in FIG. 4, the image fusion processor 424 may comprise a multi-scale image fusion circuit 502 and an image fusion circuit 503 for fusing the warped image pyramid 436 and the first image pyramid 428. The multi-scale image fusion circuit 502 is configured to fuse stages 1 through n of the received image pyramids (corresponding to downscaled full-color images), while the image fusion circuit 503 fuses stage 0 of the image pyramids (corresponding to an unscaled single-color image).

Figure 5A:
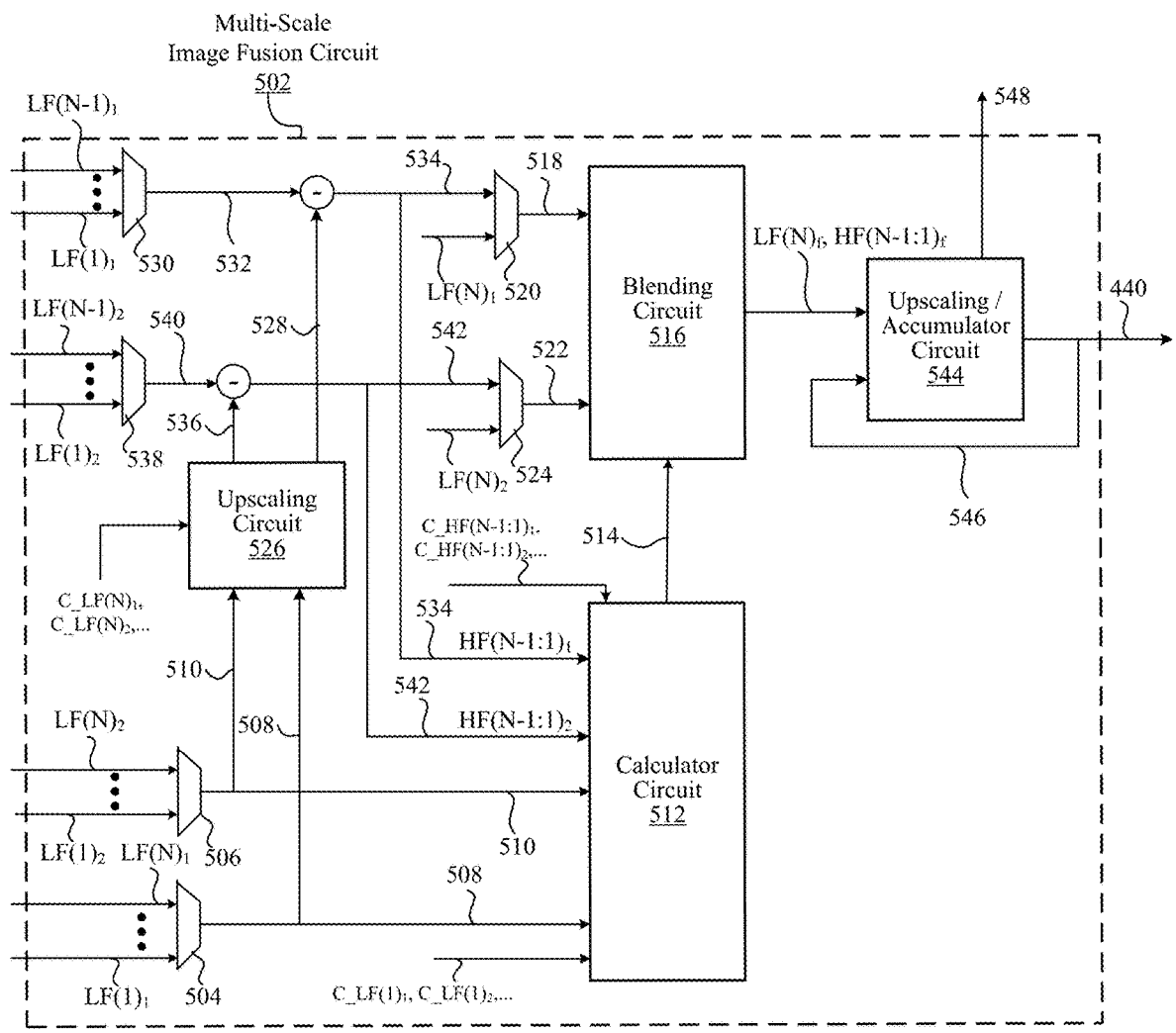
FIG. 5A is a detailed block diagram of a multi-scale image fusion circuit of an image fusion processor, according to one embodiment.

FIG. 5A is a detailed block diagram of multi-scale image fusion circuit 502 as part of image fusion processing circuit 434, according to one embodiment. Multi-scale image fusion circuit 502 performs per pixel blending between each downscaled multi-color stage of warped image pyramid 436 with a corresponding downscaled multi-color stage of the first image pyramid 428 to generate downscaled multi-color stages of a fused image pyramid 430. For example, the multi-scale image fusion circuit 502 generates first downscaled stage of fused image pyramid 430 (e.g., first downscaled stage 440) by upscaling and accumulating the multiple downscaled stages of the fused image pyramid. The first downscaled stage of fused image pyramid 430 includes multiple color components and has a pixel resolution lower than a pixel resolution of unscaled single color stage of fused image pyramid 430.

Multi-scale image fusion circuit 502 receives low frequency components of the downscaled multi-color warped images $LF(1)_1, LF(2)_1, \ldots, LF(N)_1$ as part of warped image pyramid 436 (obtained by warping each stage of the second image pyramid 426), where N represents levels of downsampling performed on the stage of the warped image pyramid 430, e.g., for an image pyramid having seven stages 0 through 6, stage 0 would correspond to the unscaled single-color image of the pyramid, and N=6 represents 6 levels of downscaling. Multi-scale image fusion circuit 502 further receives low frequency components of the downscaled multi-color images $LF(1)_2, LF(2)_2, \ldots, LF(N)_2$ as part of the second image pyramid 428. The downscaled warped image with the lowest level of resolution $LF(N)_1$ is first passed via multiplexer 504 onto calculator circuit 512 as downscaled warped image data 508. The downscaled image with the lowest level of resolution $LF(N)_2$ is also passed via multiplexer 506 onto calculator circuit 512 as downscaled image data 510. The calculator circuit 512 further receives confidence values associated with the pixels of the received downscaled images ($LF(N)_1$ and $LF(N)_2$).

Calculator circuit 512 determines a patch distance for a pixel by processing photometric distances between pixels in a patch of downscaled warped image data 508 and corresponding pixels in a patch of downscaled image data 510. The patch of downscaled warped image data 508 includes the pixel as a central pixel and other pixels within defined spatial distance from the pixel. A patch distance represents a measure of similarity between two patches. Calculator circuit 512 calculates the patch distance as a sum of Euclidian distances between corresponding pixels in both patches. For 5×5 patches, calculator circuit 512 calculates the patch distance as:

$$PD = \Sigma_{i=-2}^{i=2} \Sigma_{j=-2}^{2} ED(P1_{ij}, P2_{ij}) \quad \text{Equation 1}$$

where $ED(P1_{ij}, P2_{ij})$ is an Euclidian distance between pixels $P1_{ij}$ and $P2_{ij}$ of the first and second patch; i and j are indexes within a 5×5 patch window. Optionally, the patch size can be reduced to 3×3 or to 1×1 (a single pixel mode) independently for each scale, in which case the summation indexes i and j in Equation 1 are adjusted accordingly.

Alternatively, calculator circuit 512 calculates the patch distance in a recursive manner. If PD(n) for pixel n is known, then calculator circuit 512 calculates PD(n+1) for next right horizontal neighbor of pixel n as:

$$PD(n+1) = PD(n) - \Sigma_{j=-2}^{2} ED(P1_{3,j}, P2_{3,j}) + \Sigma_{j=-2}^{2} ED(P1_{2,j}, P2_{2,j}) \quad \text{Equation 2}$$

Calculator circuit 512 also determines a cross-correlation value (e.g., normalized cross-correlation) for the pixel by determining a cross variance between pixel values of the patch of downscaled warped image data 508 and pixel values of the patch of downscaled image data 510. The normalized cross-correlation is used as a secondary measure of patch similarity. Calculator circuit 512 calculates the normalized cross-correlation (e.g., a coefficient between −1 and 1) as:

$$NCC = \frac{VARC}{\sqrt{VAR1 * VAR2}} \qquad \text{Equation 3}$$

where VAR1 and VAR2 are variances of the patches and VARC is their cross variance.

Calculator circuit 512 determines blend parameter 514 for the pixel as a function of one or more similarity measures, e.g., the patch distance (e.g., PD determined by Equation 1 or Equation 2) and the cross-correlation value (e.g., the normalized cross correlation NCC determined by Equation 3). If the patches are more similar, a higher level of blending is performed to avoid ghosting, and vice versa. In some embodiments, the patch distance similarity score, SPD, is given by:

$$SPD=F1(PD/\text{expected noise standard variation}). \qquad \text{Equation 4}$$

In accordance with Equation 4, SPD indicates that patches that differ less than an expected noise are similar ("close"). The NCC similarity score, SNCC, is given by:

$$SNCC=F2(1-\max(0,NCC)), \qquad \text{Equation 5}$$

where functions F1 and F2 are non-linear functions, e.g., Gaussian shaped functions that can be emulated with defined slope and knee parameters. A final similarity score, S, may be determined as a sum of SPD and SNCC. For example, the final similarity score can be determined as:

$$S=\min(1,SPD+SNCC) \qquad \text{Equation 6}$$

Alternatively, the final similarity score, S, may be determined based on some other combination of SPD and SNCC. In some embodiments, the similarity score S may be based upon an output of a ghost detector, and may correspond to a value between 0 and 1.

In some embodiments, the calculator circuit 512 determines the blend parameters 514 based upon the received confidence values corresponding to the pixels of the patch of downscaled warped image data 508 and corresponding pixels of the patch of downscaled image data 510. For example, the calculator circuit 512 may determine blend parameter 514 for a pixel as a normalized combination of a weight W1 for the pixel of a reference image (a first image) and a weight W2 for a pixel of a second image. In some embodiments, the weights W1 and W2 are based on desired preprogrammed values. The weights W1 and W2 are adjusted based upon the confidence value of the respective pixels. For example:

$$W1=\text{Weights}(1)*C1 \qquad \text{Equation 7}$$

$$W2=\text{Weights}(2)*C2$$

where Weights (1) and Weights (2) correspond to preprogrammed weight values, and C1 and C2 correspond to confidence values of the respective pixels.

In some embodiments, the weights W1 and W2 may be modified by the determined similarity score S, to generate that actual per pixel weight values w1 and w2 to be used for blending that takes into account confidence and similarity. For example, the blend parameters may be determined as a combination of w1=W1 and w2=W2*S, such that if the patches are completely dissimilar (e.g., S=0), then only the pixel from the reference image is used. On the other hand, if the patched are completely similar (e.g., S=1), then fusion with weights w1=W1 and w2=W2 is performed. The ghost suppression is achieved by decreasing (in some cases to 0) weights of pixels that originate from dissimilar second image regions. Blend parameters 514, may comprise a normalized alpha blending parameter alphaNorm (e.g., for a secondary pixel to be fused) and a normalized beta blending parameter betaNorm (e.g., for a primary pixel to be fused, which may be is given by:

$$\text{alphaNorm}=w2/(w1+w2) \qquad \text{Equation 8}$$

$$\text{betaNorm}=1-\text{alphaNorm}$$

In some embodiments, blend parameter 514 is set to zero for pixels (e.g., clipping markers) marked by clipping marker circuit 424 as overexposed pixels and their derivatives are not used for blending, thus achieving proper handling of highlights in the high dynamic range case.

Blend parameters 514 for the pixel is passed onto blending circuit 516. Blending circuit 516 blends pixel value 518 of the pixel of the downscaled warped image $LF(N)_1$ (passed via multiplexer 520 onto blending circuit 516) with pixel value 522 of a corresponding pixel of the downscaled image $LF(N)_2$ (passed via multiplexer 524 onto blending circuit 516) using blend parameter 514 for the pixel as determined by the calculator circuit 512, to generate a blended pixel value for a pixel of a downscaled fused image with the lowest level of resolution $LF(N)_f$ passed onto upscaling/ accumulator circuit 544. Blending circuit 516 blends a pair of pixel values $x_1(i,j)$ and $x_2(i,j)$ in two different images (e.g., images $LF(N)_1$, $LF(N)_2$) corresponding to the same spatial coordinate (i,j) in both images using blend parameters 514 alphaNorm and betaNorm to a obtain a blended pixel value b(i,j) as given by:

$$b(i,j)=\text{betaNorm}(i,j)*x_1(i,j)+\text{alphaNorm}(i,j)*x_2(i,j) \qquad \text{Equation 9}$$

The downscaled warped image $LF(N)_1$ and downscaled image $LF(N)_2$ are also passed (via multiplexers 504 and 506) as downscaled warped image data 508 and downscaled image data 510 onto upscaling circuit 526. Upscaling circuit 526 upscales downscaled warped image data 508 two times in both horizontal and vertical dimensions to generate upscaled warped image data 528 (scale N−1). In addition, the upscaling circuit 526 further receives the confidence values corresponding to the pixels of the patch of downscaled warped image data 508 (e.g., C1), and upscales the confidence values along with the pixels of the downscaled image, such that each pixel of the upscaled image is associated with an upscaled confidence value.

Multiplexer 530 passes downscaled warped image $LF(N-1)_1$ as downscaled warped image data 532. Pixel values of upscaled warped image data 528 are subtracted from corresponding pixel values of downscaled warped image data 532 (scales N−1) to generate warped image data 534 representing a high frequency component of downscaled warped image $HF(N-1)_1$ passed onto calculator circuit 512 and onto blending circuit 516 (via multiplexer 520) as pixel values 518.

Upscaling circuit 526 also upscales downscaled image data 510 two times in both horizontal and vertical dimensions to generate upscaled image data 536 (scale N−1). In addition, the upscaling circuit 526 receives and upscales the confidence values corresponding to the pixels of the patch of downscaled image data 510 (e.g., W2), such that each pixel of the upscaled image data 536 is associated with an upscaled confidence value. Multiplexer 538 passes downscaled image $LF(N-1)_2$ as downscaled image data 540. Pixel values of upscaled image data 536 are subtracted from downscaled image data 540 (scales N−1) to generate image data 542 representing a high frequency component of downscaled image HF(N−1)$_2$ passed onto calculator circuit 512 and onto blending circuit 516 (via multiplexer 524) as pixel values 522.

Calculator circuit 512 determines a patch distance for a pixel of warped image data 534 by processing photometric distances between pixels in a patch of warped image data 534 (e.g., the high frequency component of downscaled warped image HF(N−1)$_1$) and corresponding pixels in a patch of image data 542 (e.g., the high frequency component of downscaled image HF(N−1)$_2$), as defined by Equation 1 or Equation 2. The downscaled warped image LF(N−1)$_1$ is further passed via multiplexer 504 onto calculator circuit 512 as downscaled warped image data 508. The downscaled image LF(N−1)$_2$ is also passed via multiplexer 506 onto calculator circuit 512 as downscaled image data 510. Calculator circuit 512 determines a cross-correlation value (e.g., normalized cross-correlation) for the pixel by determining a cross variance between pixel values of a patch of downscaled warped image data 508 (e.g., the low frequency component of the downscaled warped image LF(N−1)$_1$) and pixel values of the patch of downscaled image data 510 (e.g., the low frequency component of the downscaled image LF(N−1)$_2$), as defined by Equation 3.

Calculator circuit 512 determines blend parameter 514 for the pixel as a function of the patch distance and the cross-correlation value, as well as the weight values associated with the pixels of the received images, e.g., as defined above in accordance with Equations 4-8 but for high frequency components of the downscaled warped image HF (N−1)$_1$ and the downscaled image HF(N−1)$_2$). Blend parameter 514 for the pixel is passed onto blending circuit 516. Blending circuit 516 blends pixel value 518 of the pixel of the high frequency component of downscaled warped image HF(N−1)$_1$ with pixel value 522 of a corresponding pixel of the high frequency component of downscaled image HF(N−1)$_2$ using blend parameter 514 for the pixel (as defined by Equation 9) to generate a blended pixel value for a pixel of a high frequency component of downscaled fused image HF(N−1)$_f$ passed onto upscaling/accumulator circuit 544. This process of determining blending parameter 514, upscaling by upscaling circuit 526 and per-pixel blending by blending circuit 516 is recursively repeated until a high frequency component of a first downscaled version of fused image HF(1)$_f$ is generated at the output of blending circuit 516 and passed onto upscaling/accumulator circuit 544.

Figure 6A:
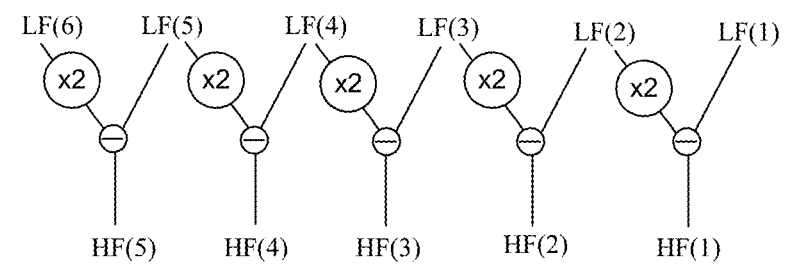
FIG. 6A is a conceptual diagram illustrating high frequency extraction and soft confidence erosion, which is performed by upscaling pyramid layers (image samples and sample confidence measures), according to one embodiment.
Figure 6A:
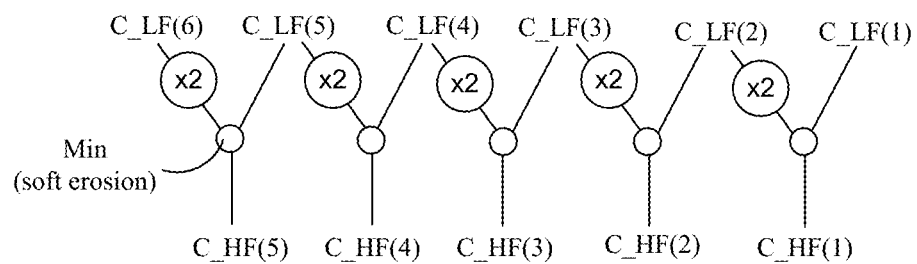

FIG. 6A is a conceptual diagram illustrating upscaling downscaled images and their associated confidence values as part of recursive image fusion processing shown in FIG. 5A, according to one embodiment. In the example of FIG. 6A, an input image (e.g., warped image 430 or processed image 438) is assumed to be downscaled 6 times (e.g., by pyramid generator 408) to generate low frequency components of downscaled images LF(6), LF(5), LF(1) that are input into multi-scale image fusion circuit 502. Upscaling circuit 526 upscales the low frequency component of downscaled image LF(6) two times in both horizontal and vertical dimensions. In some embodiments, the upscaling is performed using a 3×3 kernel. The upscaling circuit 526 subtracts the upscaled version of LF(6) from the low frequency component of downscaled image LF(5) to generate a high frequency component of downscaled image HF(5) (e.g., warped and non-warped image data 534 and 542) passed onto calculator circuit 512 and blending circuit 516. Then, upscaling circuit 526 upscales the low frequency component of downscaled image LF(5) two times in both horizontal and vertical dimensions and subtracts its upscaled version from the low frequency component of downscaled image LF(4) to generate a high frequency component of downscaled image HF(4) (e.g., warped and non-warped image data 534 and 542) passed onto calculator circuit 512 and blending circuit 516. This process is repeated by upscaling circuit 526 until a high frequency component of first downscaled version HF(1) (e.g., warped and non-warped image data 534 and 542) is generated and passed onto calculator circuit 512 and blending circuit 516.

In addition, the upscaling circuit 426 upscales the confidence values of the low frequency components of downscaled images C_LF(6), C_LF(5), . . . , C_LF(1) to generate confidence values for the high frequency components of downscaled images C_HF(5), C_HF(4), . . . , C_HF(1). Upscaling circuit 526 upscales the confidence of low frequency component of downscaled image C_LF(6) two times in both horizontal and vertical dimensions and compares its upscaled version to the confidence of low frequency component of downscaled image C_LF(5) to generate a confidence for the high frequency component of downscaled image C_HF(5) passed onto calculator circuit 512 and blending circuit 516, wherein the confidence C_HF(5) may be determined to correspond to the minimum of the upscaled version of C_LF(6) and C_LF(5) (e.g., using a minimum or soft erosion function). Then, upscaling circuit 526 upscales the confidence of the low frequency component of downscaled image C_LF(5) two times in both horizontal and vertical dimensions and compares its upscaled version to the confidence of the low frequency component of downscaled image C_LF(4) to generate a confidence of the high frequency component of downscaled image C_HF(4) (e.g., based on a minimum or soft erosion function) passed onto calculator circuit 512 and blending circuit 516. This process is repeated by upscaling circuit 526 until a confidence of a high frequency component of first downscaled version C_HF(1) is generated and passed onto calculator circuit 512 and blending circuit 516. In some embodiments, confidence values for the high frequency components of downscaled images may be determined by:

$$C(s) = \min(\text{input}.C(s), \text{upscaleConf2}(\text{input}.C(s+1)))  \quad \text{Equation 10}$$

where C(s) is an output confidence corresponding to a high frequency component of a level s downscaled image (e.g., C_HF(s)), input.C(s) and input.C(s+1) correspond to input confidences of levels s and s+1 downscaled images (e.g., C_LF(s) and C_LF(s+1), respectively), and upscaleConf2 corresponds to a confidence upscaling function (e.g., soft erosion with a kernel, where the kernel size, e.g., 3×3, is selected to be the same as kernel used for actual signal upscaling for high frequency extraction). For confidence levels corresponding to a lowest downscaled level of the image pyramid (e.g., s=6), because there is no previous s+1 level, the output confidence C(s) may be equal to the input confidence input.C(s) (e.g., C_HF(6)=C_LF(6)).

Referring back to FIG. 5A, upscaling/accumulator circuit 544 performs the process of image restoration to generate first downscaled version 448 of the fused image using fused downscaled versions LF(N)$_f$, HF(N−1)$_f$, HF(N−2)$_f$ . . . , HF(1)$_f$. More details about this process is described herein with reference to FIG. 6B.

Figure 6B:
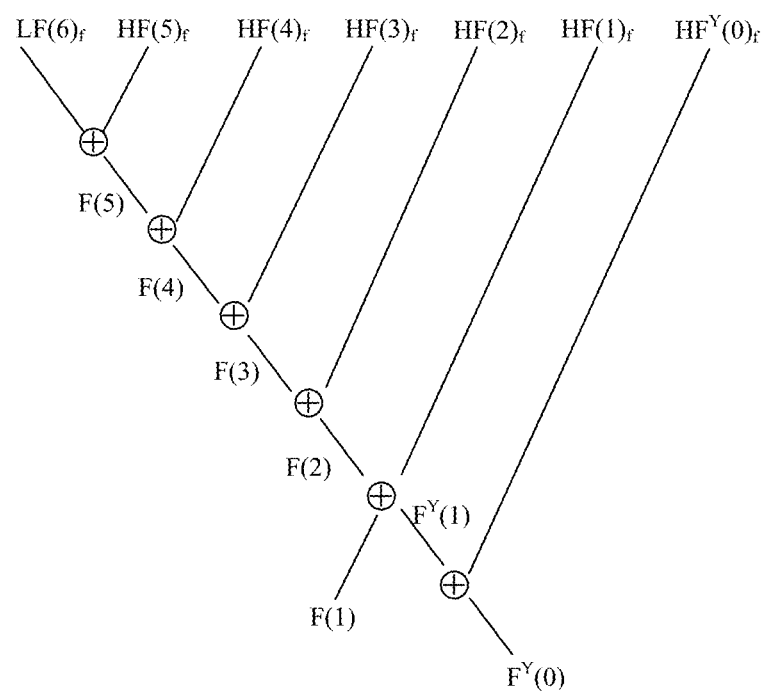
FIG. 6B is a conceptual diagram illustrating final image reconstruction, which is performed by recursively upscaling and accumulating downscaled images as part of image fusion processing, according to one embodiment.

FIG. 6B is a conceptual diagram illustrating recursively upscaling and accumulating downscaled images as part of image fusion processing, according to one embodiment. While the fused image for the lowest downscaled level (e.g., level 6) of the fused image pyramid may be obtained by fusing the corresponding images of the two image pyramids to be used, fused upper level images of the fused image pyramid may be obtained by fusing the high frequency image data and then combining the fused high frequency component of level N with the fused pyramid scale N+1 from the previous fusion step, as illustrated in FIG. 6B. In the example of FIG. 6B, blending circuit 516 generates fused downscaled versions $LF(6)_f$, $HF(5)_f$, $HF(4)_f$, ..., $HF(1)_f$ (based on blending parameters 514 as determined by the calculator circuit 512 using the similarity measures and confidence values of the received image pyramids) passed onto upscaling/accumulator circuit 544. Upscaling/accumulator circuit 544 upscales fused downscaled version $LF(6)_f$ two times in both horizontal and vertical dimensions and sums its upscaled version with fused downscaled version $HF(5)_f$ to generate downscaled fused image 546, e.g., F(5). Upscaling/accumulator circuit 544 upscales downscaled fused image 546 (e.g., F(5)) two times in both horizontal and vertical dimensions and sums its upscaled version with fused downscaled version $HF(4)_f$ to generate downscaled fused image 546, e.g., F(4). This process is repeated until upscaling/accumulator circuit 544 generates first downscaled version of fused image 440, e.g., fused image F(1) comprising the multiple color components. In addition, the upscaling/accumulator circuit 544 may upscale and accumulate confidence values for each of the fused downscaled low-frequency and high-frequency images to determine confidence values for the downscaled fused images. In some embodiments, the confidence value C_fused of a pixel of the fused image may be determined based on the confidence values C1 and C2 of the corresponding image pyramid pixels used to obtain the fused image pixel as:

$$C\_fused = C1*C2/(alphaNorm^2*C1 + betaNorm^2*C2);$$    Equation 11

The resulting images $F^Y(0)$ and F(1) may correspond to the unscaled single color image 438 and the processed first downscaled image 440 of the fused image pyramid 430 sent to the noise reduction circuit 442 and post-processor 444 for additional processing. In addition, the various downscaled fused images (e.g., F(5), F(4), ... ) may also be transmitted to the data routing circuit 411 as the downscaled images of the fused pyramid 430.

Figure 5B:
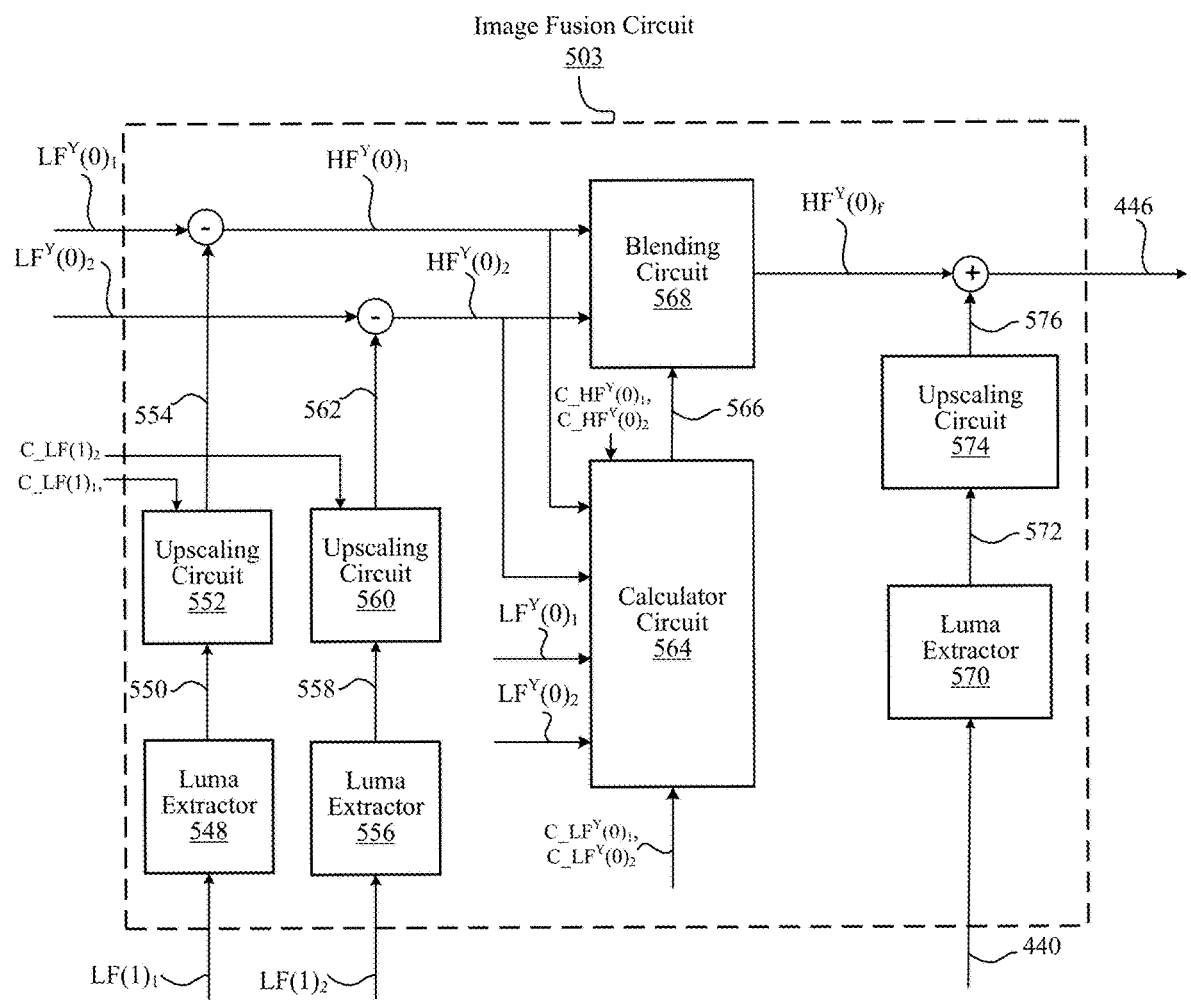
FIG. 5B is a detailed block diagram of an image fusion circuit of the image fusion processor, according to one embodiment.

FIG. 5B is a detailed block diagram of image fusion circuit 503 as part of image fusion circuit 503, according to one embodiment. Image fusion circuit 503 performs per pixel blending between unscaled single color version (e.g., luma component) of warped image 430, $LF^Y(0)_1$, with unscaled single color version (e.g., luma component) of processed image 438, $LF^Y(0)_2$, to generate unscaled single color version of fused image 438. Image fusion circuit 503 receives, as part of warped image pyramid 436 and the second image pyramid 428, unscaled single color version $LF^Y(0)_1$ and unscaled single color version $LF^Y(0)_2$, respectively. Image fusion circuit 503 further receives, downscaled warped image $LF(1)_1$ of warped image pyramid 436 and downscaled image $LF(1)_2$ of the second image pyramid 428.

Luma extractor circuit 548 extracts a single color component (luma component) from downscaled warped image $LF(1)_1$ to generate single color version of downscaled warped image 550 passed onto upscaling circuit 552. Upscaling circuit 552 upscales single color version of downscaled warped image 550 twice in both spatial dimensions to generate single color version of upscaled warped image 554. In addition, upscaling circuit 552 receives and upscales confidence values associated with the downscaled warped image $LF(1)_1$ to generate upscaled confidence value for the upscaled warped image. Pixel values of single color version of upscaled warped image 554 are subtracted from corresponding pixel values of unscaled single color version $LF^Y(0)_1$ to generate a high frequency component of unscaled single color version of warped image $HF^Y(0)_1$ passed onto calculator circuit 564 and blending circuit 568. In addition, the confidence value of $HF^Y(0)_1$ may be determined based on a minimum of the confidence values for $LF^Y(0)_1$ and the upscaled $LF(1)_1$. Unscaled single color version $LF^Y(0)_1$ and its confidence values are also passed onto calculator circuit 564.

Luma extractor circuit 556 extracts a single color component (luma component) from downscaled image $LF(1)_2$ to generate single color version of downscaled image 558 passed onto upscaling circuit 560. Upscaling circuit 560 upscales single color version of downscaled image 558 twice in both spatial dimensions to generate single color version of upscaled image 562. In addition, upscaling circuit 552 receives and upscales confidence values associated with the downscaled warped image $LF(1)_2$ to generate upscaled confidence value for the upscaled warped image. Pixel values of single color version of upscaled image 562 are subtracted from corresponding pixel values of unscaled single color version $LF^Y(0)_2$ to generate a high frequency component of unscaled single color version $HF^Y(0)_2$ passed onto calculator circuit 564 and blending circuit 568. In addition, the confidence value of $HF^Y(0)_2$ may be determined based on a minimum of the confidence values for $LF^Y(0)_2$ and the upscaled $LF(1)_2$. Unscaled single color version $LF^Y(0)_2$ and its confidence values are also passed onto calculator circuit 564.

Calculator circuit 564 determines a patch distance for a pixel by processing photometric distances between pixels in a patch of the high frequency component of unscaled single color version of warped image $HF^Y(0)_1$ and corresponding pixels in a patch of the high frequency component of unscaled single color version $HF^Y(0)_2$, as defined by Equation 1 or Equation 2. Calculator circuit 564 operates in the same manner as calculator circuit 512 of multi-scale image fusion circuit 502 except that calculator circuit 564 processes single color images whereas calculator circuit 512 processes multi-color images. Calculator circuit 564 also determines a cross-correlation value for the pixel by determining a cross variance between pixel values of a patch of unscaled single color version $LF^Y(0)_1$ and corresponding pixel values of a patch of unscaled single color version $LF^Y(0)_2$, as defined by Equation 3. Calculator circuit 564 determines blend parameter 566 for the pixel based on similarity metrics (e.g., the patch distance and the cross-correlation value) and confidence values associated with the received image data (e.g., $HF^Y(0)_1$ and $HF^Y(0)_2$) (as defined in Equations 4-8). Blend parameter 566 for the pixel is passed onto blending circuit 568. Blending circuit 568 blends a pixel value of the pixel of the high frequency component of unscaled single color version of warped image $HF^Y(0)_1$ with a pixel value of a corresponding pixel of the high frequency component of unscaled single color version $HF^Y(0)_2$ using blend parameter 566 for the pixel (as defined by Equation 9) to generate a blended pixel value for a pixel of a high frequency component of unscaled single color version of fused image $HF^Y(0)_f$. Blending circuit 568 operates in the same manner as blending circuit 516 of multi-scale image fusion circuit 502 except that blending circuit 568 performs per pixel blending of single color images whereas blending circuit 516 performs per pixel blending of multi-color images.

Image fusion circuit 503 also receives first downscaled version of fused image 440 generated by multi-scale image fusion circuit 502. Luma extractor circuit 570 extracts a single color component (luma component) from first downscaled version of fused image 440 to generate single color version of first downscaled version of fused image 572 passed onto upscaling circuit 574. Upscaling circuit 574 upscales a single color version of first downscaled version of fused image 572 twice in both spatial dimensions (horizontal and vertical dimensions) to generate a single color version of upscaled fused image 576. Pixel values of single color version of upscaled fused image 576 are summed with corresponding pixel values of the high frequency component of unscaled single color version of fused image $HF^Y(0)_f$ to generate unscaled single color version of fused image 446. The unscaled single color version of the fused image 446 may be transmitted to the noise reduction circuit 442, and may also be transmitted to the data routing circuit 411 as the unscaled single color image of the fused pyramid 430.

As further shown in FIG. 6B, a single color component (e.g., luma component) is extracted (via luma extractor circuit 570) from the first downscaled multi-color version of fused image F(1) to generate a first downscaled single color version of fused image $F^Y(1)$. The first downscaled single color version of fused image is upscaled (via upscaling circuit 574) and summed to the high frequency component of unscaled single color version of fused image $HF^Y(0)_f$ to generate an unscaled single color version of fused image $F^Y(0)$, e.g., unscaled single color version 438. The resulting fused images $F^Y(0), F(1), F(2), \ldots F(5)$ collectively form the fused image pyramid 430.

In some embodiments, the image fusion processor 434 outputs only the unscaled single color image 438 and the processed first downscaled image 440 of the fused image pyramid 430 to the noise reduction circuit 442 and post-processor 444 for noise reduction and additional processing. On the other hand, the fused images $F(5), F(4), \ldots, F(1)$ and $F^Y(0)$ generated by the upscaling/accumulator circuit 544 may be assembled to form the fused image pyramid 430, which may be provided to the DMA 418 (e.g., via the MUX 412) and stored in memory (e.g., DRAM 422). This allows for the fused image pyramid to function as a history pyramid that may be later provided to the fusion module 424 (as the first image pyramid 426 or the second image pyramid 428) to be fused with additional images (e.g., image pyramid 410 generated based on received images 402). In some embodiments, the image fusion processor 434 may output the entire fused image pyramid 436 to the noise reduction circuit 442 and post-processor 444.

Multi-Scale Image Warper

Figure 9A:
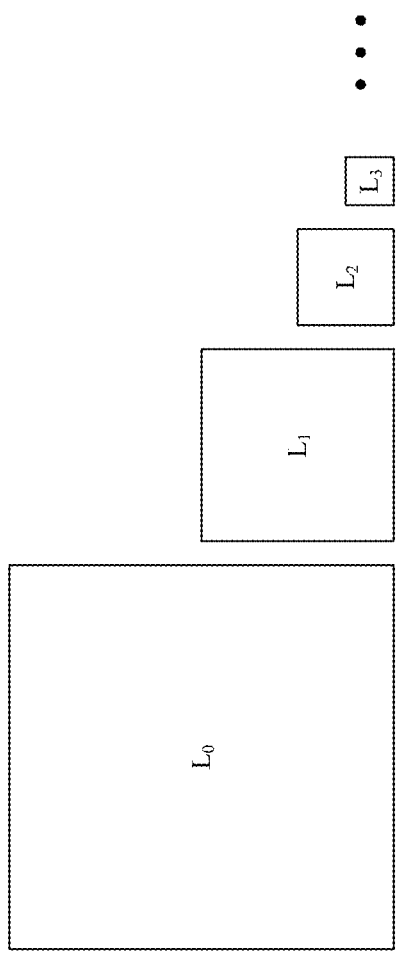
FIG. 9A is a conceptual diagram illustrating relative sizes of images of different levels of an image pyramid, in accordance with some embodiments.

As discussed above with reference to FIG. 4, the fusion module 424 receives first and second image pyramids 428 and 426, and using the warping circuit 432, generates a warped version of the second image pyramid 426 (e.g., warped image pyramid 436) spatially more aligned to the image of the first image pyramid 428 than to the image of the second image pyramid 426. The warping circuit 432 receives a plurality of images corresponding to the levels of the second image pyramid 426 (hereinafter also referred to as the un-warped image pyramid 426), comprising base level $L_0$ correspond to a single-color (e.g., luma component only) unscaled image, and one or additional levels $L_1$ through $L_N$ corresponding to sequentially downscaled full-color versions of the image. FIG. 9A is a conceptual diagram illustrating relative sizes of images of different levels of an image pyramid, in accordance with some embodiments. As illustrated in FIG. 9A, the unscaled image of level $L_0$ has a first size, and the images for each subsequent level $L_1$ through $L_N$ may be downscaled relative to the image of the previous level by a factor of 2 along each dimension (e.g., the $L_1$ image having half the width and height of the $L_0$ image, the $L_2$ image having half the width and height of the $L_1$ image, etc.).

Figure 7:
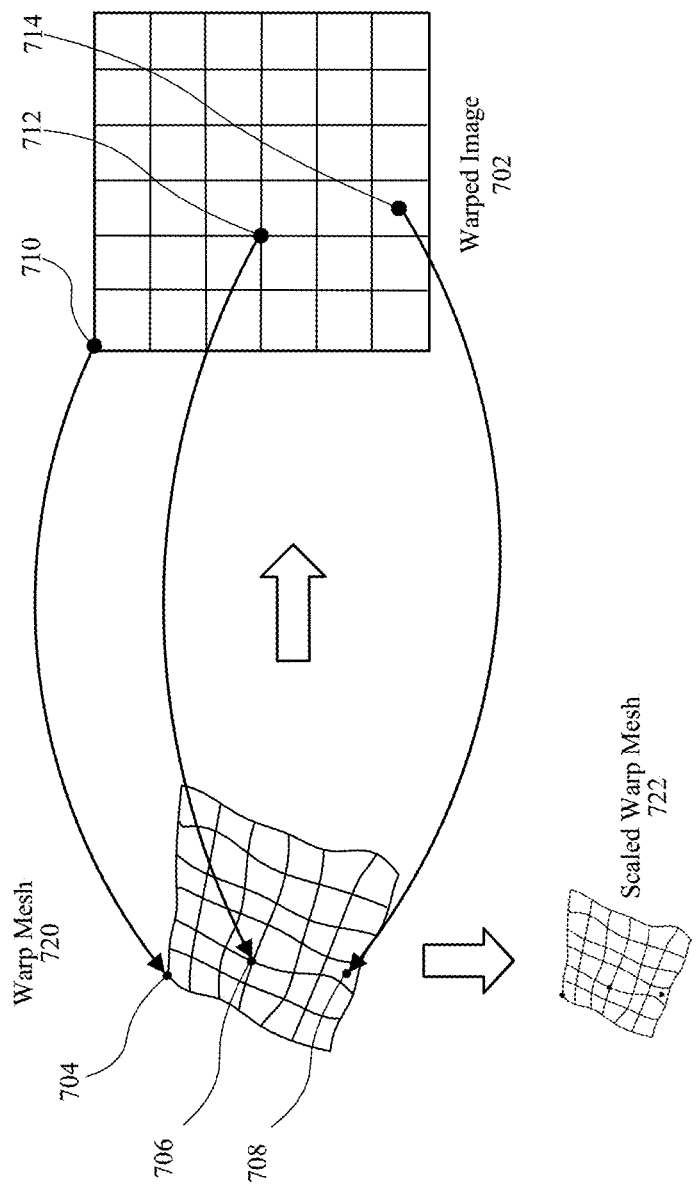
FIG. 7 is a conceptual diagram illustrating warping of images using a warp mesh, in accordance with some embodiments.

The warping circuit 432 uses warping parameters 406 determined by the image registration processor 404 to generate the warped image pyramid 436 from the un-warped image pyramid 426. As discussed above with reference to FIG. 4, the warping parameters 406 may be in the form of a warp mesh or grid. FIG. 7 is a conceptual diagram illustrating warping of images using a warp mesh, according to one embodiment. The warp mesh 720 defines the warping to be performed on an input image (e.g., an image of the un-warped image pyramid 426), and comprises a plurality of grid points, each grid point mapping a pixel location in the input image to pixel locations in the warped image 702. For example, using the warp mesh 720, the pixels of the input image corresponding to input coordinates 704, 706, and 708 map to output coordinates 710, 712, and 714 of the warped image 702, respectively. The warp mesh 720 can be coarser or finer than the mesh illustrated in FIG. 7. In addition, while FIG. 7 illustrates the warp mesh 720 has having a uniform distribution of grid points on the warped image (e.g., grid points spaced at regular intervals, such as 32 pixels along each dimension), it is understood that in some embodiments, the warp mesh may comprise a non-uniform distribution of warped image coordinates, e.g., to achieve a desired amount of local warping within different regions of the image. In some embodiments, the warp mesh 720 may specify a uniform distribution of input image coordinates mapped to a non-uniform distribution of warped image coordinates.

In some embodiments, the warp mesh 720 corresponds to a particular image size, such as a size of the unscaled image of the un-warped image pyramid 426. In order to warp the first image pyramid to generate the warped image pyramid, the warping circuit 432 warps each level of the image pyramid. To do so, the warping circuit 432 scales the warp mesh 720 in accordance with each level of the image pyramid, and warps the image in accordance with the corresponding scaled warp mesh. For example, as illustrated in FIG. 7, the warping circuit 432 uses the warp grid 720 to warp an input image to generate the warped image 702. In addition, the warping circuit 432 may scale the warp mesh 720 to generate a scaled warp mesh 722 for warping input images corresponding to a subsequent downscaled level of the image pyramid.

Figure 8:
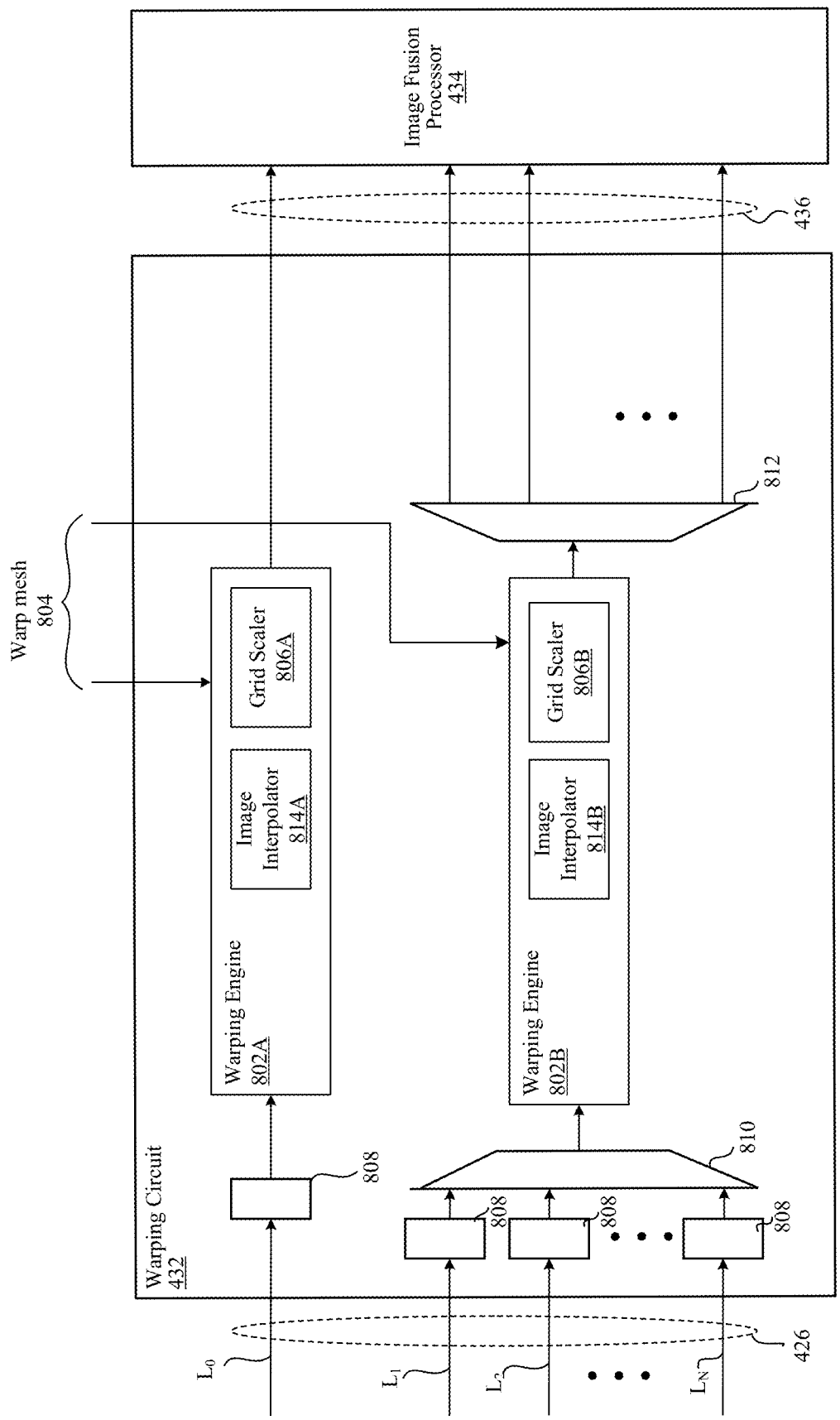
FIG. 8 illustrates a block diagram of the warping circuit 432, in accordance with some embodiments.

FIG. 8 illustrates a block diagram of the warping circuit 432, in accordance with some embodiments. The warping circuit 432 receives the un-warped image pyramid 426 (e.g., from DMA 418) and generates a warped image pyramid 436 to be used by the image fusion processor 434. The un-warped image pyramid 426 comprises a plurality of levels, including a base level $L_0$ corresponding to a single-color unscaled image, and a plurality of downscaled levels $L_1$ to $L_N$ each corresponding to a full-color sequentially-downscaled image. For example, each of the plurality of levels may correspond to an image downscaled from a previous level by a factor of 2 along each dimension (e.g., as illustrated in FIG. 9A).

The warping circuit 432 receives the images corresponding to the levels of the un-warped image pyramid 426, and warps images for at least two of the levels in parallel. To perform concurrent warping of different levels of the image pyramid, the warping circuit 432 comprises a plurality of warping engines 802 in the form of distinct circuits. For example, as illustrated in FIG. 8, the warping circuit 432 comprises a first warping engine 802A and a second warping engine 802B, although it is understood that in other embodiments, the warping circuit 432 may have a different number of warping engines. Each warping engine 802 is a circuit that warps a different subset of the levels of the un-warped image pyramid 426, and may operate concurrently with the other warping engines of the warping circuit 432. In some embodiments, the first warping engine 802A warps the image corresponding to the base level $L_0$ of the un-warped image pyramid 426, while the second warping engine 802B warps images corresponding to the downscaled levels $L_1$ to $L_N$ of the un-warped image pyramid 426. In some embodiments, each warping engine 802 is implemented identically. In some embodiments, where the first warping engine 802A warps only the base level $L_0$ of the received image pyramid, the first warping engine 802A may contain circuitry to warp only images having a single color component (e.g., luminance only), while the second warping engine 802B contains circuitry to warp multi-color component images.

The warping circuit 432 receives a warp mesh 804 for warping the un-warped image pyramid 426 stored in a memory or cache (not shown). The warp mesh 804 may correspond to warping parameters 406 determined by the image registration processor 404 based upon the image used to generate the un-warped image pyramid 426 (e.g., an image 402) and an image associated with the first image pyramid 428. The warp mesh 804 may correspond to a warp mesh 720 as illustrated in FIG. 7, and comprises mappings that map coordinates of an input image to those of a warped output image, and/or motion vectors that indicate a transformation of coordinates of the input image to produce the warped output image.

The coordinates of the warp mesh 804 may correspond to an input image of a particular size. As the images of different levels of the first image pyramid will have different sizes, the warping circuit 432 scales the warp mesh 804 by amounts corresponding to the different image sizes of the levels of the first image pyramid. In some embodiments, each warping engine 802A and 802B comprises a respective grid scaler 806A and 806B for scaling the warp mesh 804 by respective amounts corresponding to the levels of the image pyramid handled by the warping engine 802. Each grid scaler 806 scales the warp mesh 804 by scaling the coordinate and/or vector values of the warp mesh 804 along each dimension (e.g., input and output coordinate values) by a respective amount based upon the image size of a level currently being processed by the respective warping engine 802.

In some embodiments, each grid scaler 806 scales a portion of the warp mesh 804 at a time. For example, in some embodiments, each warping engine 802 receives and warps a portion of an image of the un-warped image pyramid 426 at a time (e.g., a predetermined number of rows, tiles, etc.). The corresponding grid scaler 806 may thus scale a corresponding portion of the warp mesh 804 based on the size of the image to be warped (e.g., a predetermined number of rows of the warp mesh 804 needed to warp the received portion of the image). In embodiments where the mesh points of the warp mesh 804 are consumed as output image data for the warped image pyramid is generated, the grid scaler 806 may scale the mesh points as they are consumed. In other embodiments, each warping engine 802 comprises a memory or cache to store one or more scaled warp meshes generated by its grid scaler 806, allowing for the grid scaler 806 to scale and store an entire scaled warp mesh corresponding to the warp mesh 804. For example, in some embodiments, the second warping engine 802B may comprise sufficient memory to store a plurality of scaled warp meshes corresponding to a plurality of levels of the image pyramid. In other embodiments, as the grid scaler 806 scales the mesh points as they are consumed (e.g., used to warp corresponding portions of image data of the image pyramid), the second warping engine 802B may store only a portion of the scaled mesh at a time.

In some embodiments, the warp mesh 804 corresponds to an image size of the unscaled image of the image pyramid (e.g., base level $L_0$). As such, in embodiments where the first warping engine 802A warps only the base level $L_0$ of the image pyramid, the first warping engine 802A may not contain a grid scaler 806A.

As the warping mesh 804 comprises sparse grid points (e.g., every 32 pixels unscaled), each grid scaler 806 may, upon scaling the warp mesh 804 (or a portion thereof), interpolate the scaled warp mesh to determine mappings for pixel locations of the input image that do not coincide with the grid points of the scaled warp mesh. In some embodiments, the mapping for each location of the image is interpolated based upon mapping values of the four closest grid points of the scaled warp mesh. For example, as illustrated in FIG. 7, input coordinates 704 and 706 correspond to existing grid points of the warp mesh 720. However, input coordinate 708 is not an existing grid point of the warp mesh 720. Instead, mappings of the four surrounding grid points of the warp mesh 720 are interpolated to determine a mapping for the input coordinate 708. The interpolation may comprise bilinear interpolation, bicubic interpolation, and/or other types of interpolation.

The warping circuit 432 receives images of the un-warped image pyramid 426 corresponding to different levels in parallel. The warping circuit 432 comprises a plurality of buffers 808 that cache portions of the received images of the un-warped image pyramid 426 as they are received. In some embodiments, images of each level of the un-warped image pyramid 426 are cached in respective buffers 808. Each buffer 808 may store a particular amount of the image for each level, such as a particular number of rows of the image (e.g., 12 lines). In some embodiments, each buffer 808 can store up to a predetermined number of tiles of the image of the respective level. Although FIG. 8 illustrates the warping circuit 432 has having different buffers 808 corresponding to each level of image data, it is understood that in some embodiments, the buffers 808 may be implemented as using fewer buffers (e.g., a single buffer).

In some embodiments, because the first warping engine 802A warps only images of the base level $L_0$ of the image pyramid, the first warping engine 802A may receive image data for level $L_0$ directly from the respective buffer 808. In addition, the warped output data of the first warping engine 802A may be transmitted to the image fusion processor 434 as the base level $L_0$ of the warped image pyramid 436.

On the other hand, the second warping engine 802B warps images of a plurality of downscaled levels. The second warping engine 802B may be coupled to a routing circuit 810 that selects between data of different images of different levels (e.g., $L_1$ through $L_N$). In some embodiments, the routing circuit 810 comprises a multiplexor that selects between the different buffers 808 corresponding to levels $L_1$ through $L_N$. The routing circuit 810 selects between the different levels such that image data from the different levels to be processed by the second warping engine 802B is interleaved (discussed in greater detail below with reference to FIG. 9B). In addition, the second warping engine 802B may be coupled to a derouting circuit 812 (e.g., a de-multiplexor) that routes warped output data from the second warping engine 802B to the appropriate level of the warped image pyramid 436. The derouting circuit 812 may be synchronized with the routing circuit 810, to ensure that image data of a certain level passed to the second warping engine 802A by the routing circuit 810 is routed to the same level of the warped image pyramid by the derouting circuit 812. The assembled images of the warped image pyramid 436 may be transmitted to the image fusion processor in parallel.

The routing circuit 810 may further be synchronized with the grid scaler 806B of the second warping engine 802A, such that the grid scaler 806B will scale a portion of the warp mesh 804 to a given level corresponding to the portion and level of the image data transmitted by the routing circuit 810 to the warping engine 802B. For example, when the routing circuit 810 transmits a portion of the $L_1$ level image of the first image pyramid (e.g., a first set of rows of the image), the grid scaler 806B scales a corresponding portion of the warp mesh 804 based on the size of the $L_1$ level image. As such, the grid scaler 806B may scale portions of the warp mesh 804 to different levels in an interleaved manner corresponding to the transmission of different portions of images of different levels of the image pyramid.

Each warping engine 802 is a circuit that receives and processes portions of the images of the un-warped image pyramid 426. In some embodiments, each warping engine 802 comprises a respective image interpolator circuit 814. The image interpolator circuit receives image data of the image pyramid level to be warped (e.g., from the buffers 808) and interpolates values of the received image data based upon corresponding portions of the scaled warp mesh generated by the grid scaler 806. For example, in some embodiments, the image interpolator circuit 814 blends pixels of the received image based upon the scaled warp mesh. For example, when the warp mesh 804 is scaled and interpolated (e.g., by the grid scaler 806, as discussed above), the mesh points of the scaled warp mesh may be interpolated to generate, for each output pixel, a position in the input image. The interpolated positions may include fractional intra-pixel positions, which the image interpolator circuit 814 may use to determine one or more filter weights. For example, if an output pixel of the scaled and interpolated warp mesh is associated with a fractional input position such as 0.5, the image interpolator circuit 814 may blend two or more pixels of the received image data to determine a value for the input position (e.g., by blending pixels at positions 0 and 1 with a weight of 50% each). The interpolator circuit 814 may use algorithms such as bilinear interpolation, bicubic interpolation, nearest neighbor, or other types of interpolation algorithms to blend the pixel values of the input image data. In some embodiments, the image interpolator circuit 814 may support a plurality of fractional positions (e.g., 16 fractional positions, corresponding to 16 possible filters).

The warping engine 802 further processes the interpolated input image data (e.g., output by the respective image interpolator 814) using the interpolated scaled warp mesh (e.g., output by the respective grid scaler 806) to generate warped image data for the warped image pyramid 436.

Parallel Warping

The warping engines 802 each warp portions of the received images over different time periods. For example, the first warping engine 802A sequentially warps portions of the $L_0$ base level image of the un-warped image pyramid 426. In some embodiments, each portion may correspond to a row of pixels of the $L_0$ image, or a row of tiles of the $L_0$ image. The second warping engine 802B sequentially warps portions of the one or more downscaled level images of the un-warped image pyramid 426 in an interleaved manner. For example, the second warping engine 802B may warp a row of the $L_1$ level image during a first time period, a row of the $L_2$ level image during a second time period, etc.

The amount of time needed for the warping engines 802 to warp a portion of a received image is proportional to a size of the image portion being warped (e.g., a number of pixels or tile being warped). Where each level of downsampling of an image pyramid is downsampled from the previous level by factor of 2 across each dimension, each row of the $L_0$ level image of an image pyramid contains twice the number of pixels and/or tiles as a row of the $L_1$ level of the image pyramid. As such, an amount of time for the first warping engine 802A to warp a row of the $L_0$ may be twice that for the second warping engine 802B to warp a row of the $L_1$ level image of the image pyramid. In some embodiments, the warping engines 802 warp the color components of each pixel of the image in parallel. Such, an amount of time needed to warp a row of a single-color component image (e.g., of the $L_0$ base level image) may be the same as an amount of time needed to warp a row of a full-color image of the same size.

Figure 9B:
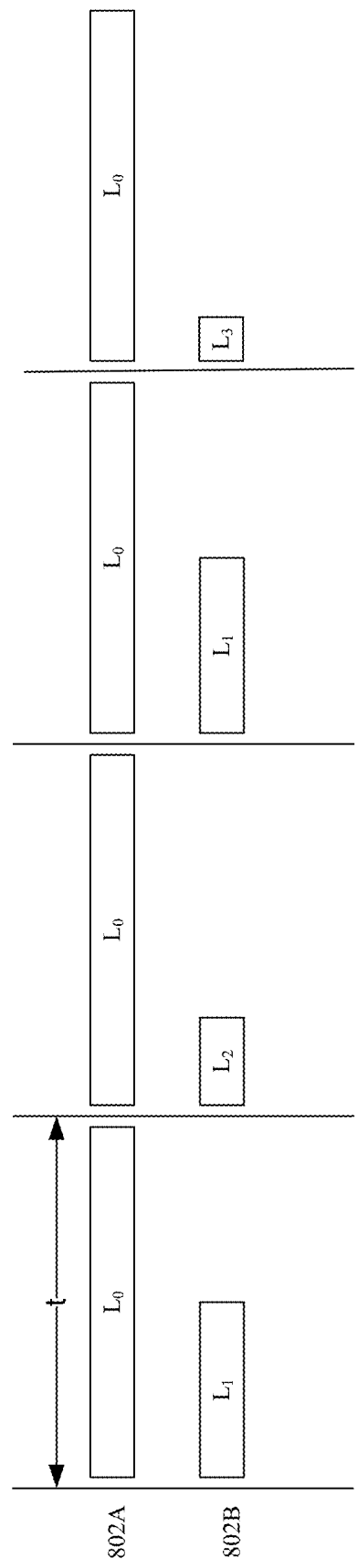
FIG. 9B illustrates a diagram of how the warping engines may be configured to warp portions of the images of the first image pyramid, in accordance with some embodiments.

FIG. 9B illustrates a diagram of how the warping engines may warp portions of the images of the first image pyramid, in accordance with some embodiments. The first and second warping engines 802A and 802B of the warping circuit 432 operate in parallel. As illustrated in FIG. 9B, it may take the first warping engine 802A a period of time t to warp each row of the $L_0$ level image of the image pyramid. As illustrated in FIG. 9A, the downscaled $L_1$ level image of the image pyramid is downscaled relative to the $L_0$ level unscaled imaged by a factor of 2 along each dimension (e.g., height and width). As such, the $L_1$ level image of the image pyramid will have half the number of rows as the $L_0$ level image, with each row having half the number of pixels/tiles. In addition, each subsequent downscaled level image will have half the number of rows as the previous level, each row having half the number of tiles/pixels. The second warping engine 802B will thus be able to warp a row of the $L_1$ level image of the image pyramid in approximately $t/2$ time, a row of the $L_2$ level image of the image pyramid in approximately $t/4$, a row of the $L_N$ level of the image in approximately $t/2^N$ time, etc.

In some embodiments, such as that illustrated in FIG. 9B, the second warping engine 802B, during each period of time t, receives (e.g., from the routing circuit 810) and warps a row of an image of one of the downscaled levels $L_1 \ldots L_N$ of the image pyramid (e.g., in parallel with the first warping engine 802A warping a row of the $L_0$ level image). As the total number of rows of the downscaled levels $L_1 \ldots L_N$ will not exceed the number of rows of the $L_0$ level image (e.g., level $L_1$ having half the number of rows of $L_0$, level $L_2$ having a quarter the number of rows, and so forth), the second warping engine 802B is able to warp all rows of the downscaled levels $L_1 \ldots L_N$ of the image pyramid in the amount of time needed by the first warping engine 802A to warp the rows of the $L_0$ image of the image pyramid, warping one row of one of the downscaled level images per time period t. In some embodiments, the routing circuit 810 selects a row of the downscaled levels $L_1 \ldots L_N$ during each time period t to be received by the second warping engine 802B, the rows selected with a frequency based upon a level of downscaling associated with the respective level, e.g., a row of the $L_1$ image every second period t, a row of the $L_2$ level image approximately every fourth period t, etc. In addition, while FIG. 9B illustrates the rows of the downscaled level images of the image pyramid received in an interleaved manner, it is understood that in other embodiments, the warping engine 802B may receive and warp rows of the downscaled level images in a different order (e.g., receive and warp the rows of the $L_1$ level image sequentially, followed by those of the $L_2$ level image, etc.). In some embodiments, the warping engine 802A receives and warps rows of the downscaled level images in an order determined based upon a rate at which the image fusion processor 434 consumes the image data of the warped image pyramid 436 when fusing the images of the warped image pyramid 436 with the first image pyramid 428. By warping rows of the downscaled images in an interleaved manner as they are consumed by the image fusion processor 434, an amount of memory that may be needed by the warping circuit to store warped image data that the image fusion processor 434 is not ready to consume. In some embodiments, the images are warped in an interleaved manner so that the image fusion processor 434 may receive and process corresponding portions of images corresponding to different levels of the image pyramid for performing image fusion, before receiving corresponding portions of other parts of the images.

In other embodiments, the second warping engine 802B may receive and warp multiple rows of the downscaled levels $L_1 \ldots L_N$ during a period t in which the first warping engine 802A warps a row of the $L_0$ level image.

By using multiple warping engines to warp the images corresponding to different levels of the image pyramid in parallel, the amount of time needed to warp an image pyramid may be improved. By using a first warping engine to warp the base level of the image pyramid, and a second warping engine to warp the downscaled levels of the image pyramid, the entire image pyramid can be warped in an amount of time similar that does not exceed the amount of time needed to warp the base level image of the image pyramid alone. In addition, by using two warping engines and image interpolator circuits (e.g., one for the unscaled base level of the image pyramids, and one for all downscaled levels of the image pyramid) instead of using a separate warping engine for each level of the image pyramid, the amount of hardware resourced needed by the warping circuit is reduced.

Process Flow

Figure 10:
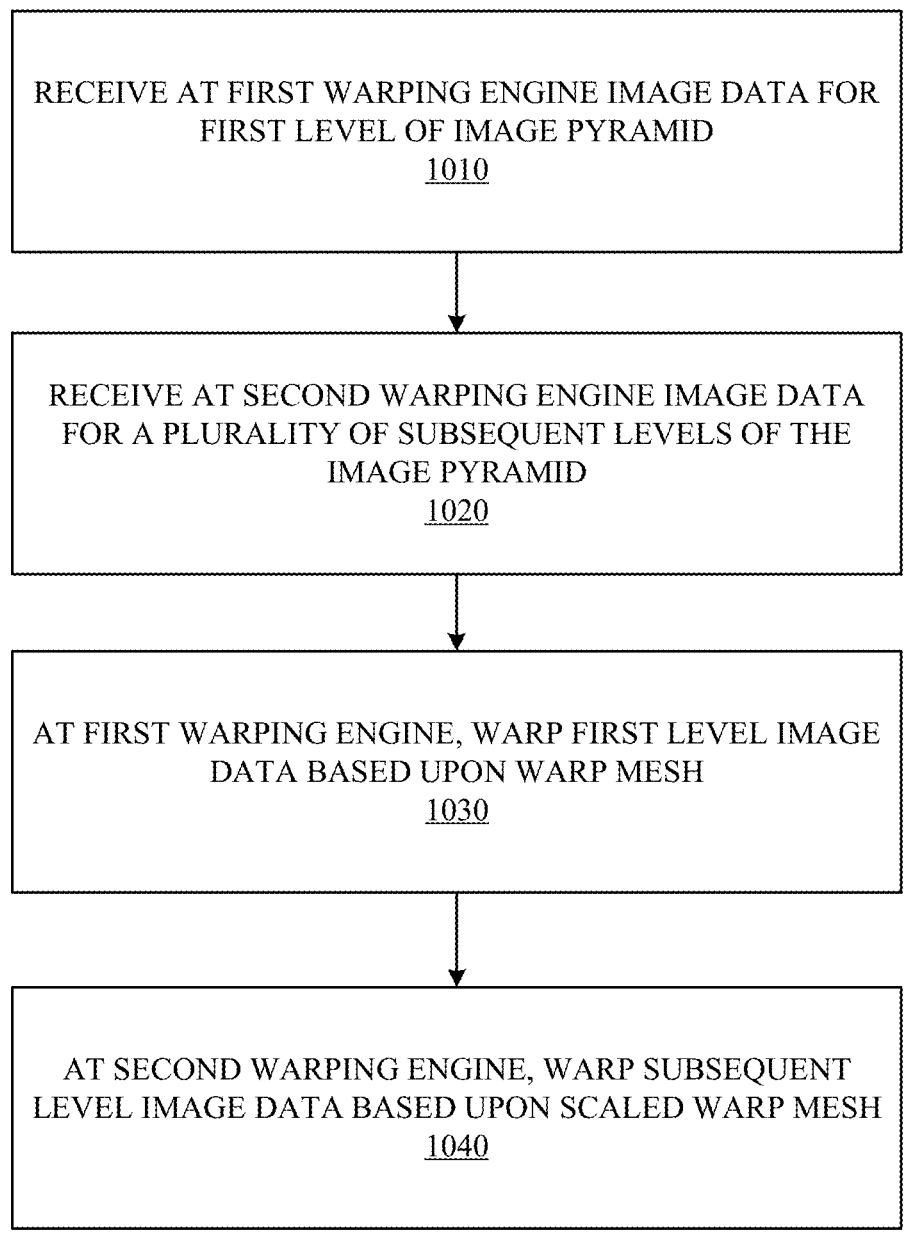
FIG. 10 is a flowchart of a process for warping an image pyramid using a multi-scale warping circuit, in accordance with some embodiments.

FIG. 10 is a flowchart of a process for warping an image pyramid using a multi-scale warping circuit, in accordance with some embodiments. The process illustrated in FIG. 10 may be performed by a warping circuit, such as the warping circuit 432 illustrated in FIG. 4 and/or FIG. 8) that comprises at least a first warping engine and a second warping engine.

The warping circuit at 1010 receives, at the first warping engine, image data for a first level of an image pyramid (e.g., a base level of the image pyramid). In some embodiments, the first warping engine receives respective portions of the image data over a plurality of time periods. Each portion may correspond to a predetermined number of rows of the image data, a predetermined number of tiles, and/or the like.

The warping circuit at 1020 receives, at the second warping engine, image data for a plurality of subsequent levels of the image pyramid (e.g., downscaled levels of the image pyramid). In some embodiments, the second warping engine receives portions of the image data over a plurality of time periods, each portion corresponding to a predetermined number of rows or tiles of a downscaled level image. In some embodiments, the second warping engine may receive multiple portions of the image data during a time period of the plurality of time periods. In some embodiments, the image data may be interleaved such that the second warping engine sequentially receives portions of image data corresponding to different levels of image pyramid.

The warping circuit at 1030 warps, at the first warping engine, the image of the first level of the image pyramid based upon a warp mesh. In some embodiments, the warp mesh comprises a sparse grid of warping parameters mapping locations of an input image to those of a warped output image. The first warping engine may interpolate the warp mesh to determine warping parameters for locations of the input image outside the sparse grid points of the warp mesh. In addition, the first warping engine may interpolate the pixel data of the received image based upon the interpolated warp mesh, and warp the interpolated pixel data to generate a warped output image. In some embodiments, the first warping engine warps respective portions of the received image over respective time periods t.

The warping circuit at 1040 warps, at the second warping engine, images of the plurality of subsequent levels of the image pyramid based upon the warp mesh, in parallel with the first warping engine warping the image of first level image. The second warping engine, for each of the subsequent levels, scales the warp mesh based upon a level of downsampling corresponding to the level. In some embodiments, the second warping engine, during each time period t in which the first warping engine warps a portion of the first level image, warps a portion of one of the plurality of subsequent level images. In other embodiments, the second warping engine may, during a time period t, warp multiple portions of a subsequent level image and/or multiple portions of a plurality of subsequent level images. Due to the scaling between the levels of the image pyramid, the second warping engine may, in some embodiments, warp the images corresponding to all subsequent levels of the image period in a time taken by the first warping engine to warp the first level of the image pyramid.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A multi-scale warping circuit, comprising:
  a first warping circuit configured to warp a first image corresponding to a first level of an image pyramid using a warping mesh to generate a warped first image, the image pyramid comprising a plurality of levels each corresponding to a respective downscaling level of a source image, and the warping mesh based upon a correspondence between the source image and another image; and
  a second warping circuit configured to:
    receive a plurality of images corresponding to a plurality of levels of the image pyramid subsequent to the first level;
    for each of the plurality of images, scale the warping mesh by a respective amount based upon the level of the image in the image pyramid to generate a respective scaled warping mesh; and
    warp each of the plurality of images using its respective scaled warping mesh to generate a plurality of warped images corresponding to the subsequent levels of the image pyramid, the warping of the plurality of images performed in parallel with the warping of the first image by the first warping circuit.

2. The multi-scale warping circuit of claim 1, wherein the warping mesh has a size based upon a size of the first image.

3. The multi-scale warping circuit of claim 1, wherein:
the first warping circuit is configured to sequentially warp rows of the first image; and
the second warping circuit is configured to warp rows of the plurality of images in an interleaved manner.

4. The multi-scale warping circuit of claim 1, wherein the warped first image and the plurality of warped images form a warped image pyramid output to an image fusion processor configured to fuse the warped image pyramid with a second image pyramid associated with the another image.

5. The multi-scale warping circuit of claim 1, wherein the first warping circuit and the second warping circuit are configured to receive the first image and the plurality of images from a memory or cache where the image pyramid is stored in a tile format.

6. The multi-scale warping circuit of claim 1, wherein the second warping circuit is configured to:
during a first time period:
receive a portion of a second image corresponding to a second level of the image pyramid;
scale a portion of the warping mesh corresponding to the received portion of the second image by a downscaling factor corresponding to the second level;
during a second time period after the first time period:
receive a portion of a third image corresponding to a third level of the image pyramid;
scale a portion of the warping mesh corresponding to the received portion of the third image by a downscaling factor corresponding to the third level.

7. The multi-scale warping circuit of claim 1, further comprising a routing circuit configured to:
receive the plurality of images corresponding to the plurality of subsequent levels of the image pyramid, and
over each of a plurality of time periods, provide a selected portion of an image of the plurality of images to the second warping circuit, wherein portions of the plurality of images are provided to the second warping circuit in an interleaved manner.

8. The multi-scale warping circuit of claim 1, wherein:
the first warping circuit is configured warp respective portions of the first image in sequence over each of a plurality of time periods;
the second warping circuit is configured to, over at least one time period of the plurality of time periods, warp portions of multiple images of the plurality of images.

9. The multi-scale warping circuit of claim 1, wherein:
the first warping circuit is configured warp respective portions of the first image in sequence over each of a plurality of time periods;
the second warping circuit is configured to warp a portion of a single image of the plurality of images over each time period of the plurality of time periods in parallel with the first warping circuit.

10. The multi-scale warping circuit of claim 1, wherein the warping mesh comprises a matrix of sparse grid points, and wherein the first warping circuit is configured to:
generate an interpolated warping mesh by interpolating warping parameters for one or more image locations outside the sparse grid points of the warping mesh, based upon one or more closest grid points of the warping mesh;
interpolate one or more pixel values of the first image using one or more nearby pixels, based upon the interpolated warping mesh.

11. A method for warping image pyramids, comprising:
at a first warping circuit, warping a first image corresponding to a first level of an image pyramid using a warping mesh to generate a warped first image, the image pyramid comprising a plurality of levels each corresponding to a respective downscaling level of a source image, and the warping mesh based upon a correspondence between the source image and another image; and
at a second warping circuit, receiving a plurality of images corresponding to a plurality of levels of the image pyramid subsequent to the first level;
at the second warping circuit, for each of the plurality of images, scaling the warping mesh by a respective amount based upon the level of the image in the image pyramid to generate a respective scaled warping mesh; and
at the second warping circuit, warping each of the plurality of images using its respective scaled warping mesh to generate a plurality of warped images corresponding to the subsequent levels of the image pyramid, the warping of the plurality of images performed in parallel with the warping of the first image by the first warping circuit.

12. The method of claim 11, wherein:
warping the first image at the first warping circuit comprises sequentially warping rows of the first image; and
warping each of the plurality of images at the second warping circuit comprises warping rows of the plurality of images in an interleaved manner.

13. The method of claim 11, further comprising forming a warped image pyramid from the warped first image and the plurality of warped images, and outputting the warped image pyramid to an image fusion processor configured to fuse the warped image pyramid with a second image pyramid associated with the another image.

14. The method of claim 11, wherein warping each of the plurality of images at the second warping circuit comprises:
during a first time period:
receiving a portion of a second image corresponding to a second level of the image pyramid;
scaling a portion of the warping mesh corresponding to the received portion of the second image by a downscaling factor corresponding to the second level;
during a second time period after the first time period:
receiving a portion of a third image corresponding to a third level of the image pyramid;
scaling a portion of the warping mesh corresponding to the received portion of the third image by a downscaling factor corresponding to the third level.

15. The method of claim 11, wherein:
warping the first image at the first warping circuit comprises warping respective portions of the first image in sequence over each of a plurality of time periods;
warping each of the plurality of images at the second warping circuit comprises warping, over at least one time period of the plurality of time periods, portions of multiple images of the plurality of images.

16. The method of claim 11, wherein:
warping the first image at the first warping circuit comprises warping respective portions of the first image in sequence over each of a plurality of time periods;

warping each of the plurality of images at the second warping circuit comprises warping a portion of a single image of the plurality of images over each time period of the plurality of time periods in parallel with the first warping circuit.

17. The method of claim 11, wherein the warping mesh comprises a matrix of sparse grid points, and further comprising:

at the first warping circuit, generating an interpolated warping mesh by interpolating warping parameters for one or more image locations outside the sparse grid points of the warping mesh, based upon one or more closest grid points of the warping mesh; and interpolating one or more pixel values of the first image using one or more nearby pixels, based upon the interpolated warping mesh.

18. An electronic device, comprising:

a memory;

an image signal processor comprising:

a first warping circuit configured to warp a first image corresponding to a first level of an image pyramid using a warping mesh to generate a warped first image, the image pyramid comprising a plurality of levels each corresponding to a respective downscaling level of a source image, and the warping mesh based upon a correspondence between the source image and another image; and a second warping circuit configured to:

receive a plurality of images corresponding to a plurality of levels of the image pyramid subsequent to the first level;

for each of the plurality of images, scale the warping mesh by a respective amount based upon the level of the image in the image pyramid to generate a respective scaled warping mesh; and warp each of the plurality of images using its respective scaled warping mesh to generate a plurality of warped images corresponding to the subsequent levels of the image pyramid, the warping of the plurality of images performed in parallel with the warping of the first image by the first warping circuit.

19. The electronic device of claim 18, wherein:

the first warping circuit is configured to sequentially warp rows of the first image; and the second warping circuit is configured to warp rows of the plurality of images in an interleaved manner.

20. The electronic device of claim 18, wherein the second warping circuit is configured to:

during a first time period:

receive a portion of a second image corresponding to a second level of the image pyramid;

scale a portion of the warping mesh corresponding to the received portion of the second image by a downscaling factor corresponding to the second level;

during a second time period after the first time period:

receive a portion of a third image corresponding to a third level of the image pyramid;

scale a portion of the warping mesh corresponding to the received portion of the third image by a downscaling factor corresponding to the third level.

\* \* \* \* \*